US012735348B2

(12) United States Patent
Matano et al.

(10) Patent No.: US 12,735,348 B2
(45) Date of Patent: Sep. 15, 2026

(54) CRYSTALLIZED GLASS

(71) Applicant: NIPPON ELECTRIC GLASS CO., LTD., Otsu (JP)

(72) Inventors: Takahiro Matano, Otsu (JP); Yuki Yokota, Otsu (JP); Atsushi Tanaka, Otsu (JP); Tomonori Ichimaru, Otsu (JP); Yoshihisa Takayama, Otsu (JP); Ken Yuki, Otsu (JP)

(73) Assignee: NIPPON ELECTRIC GLASS CO., LTD., Otsu (JP)

( * ) Notice: Subject to any disclaimer, the term of this patent is extended or adjusted under 35 U.S.C. 154(b) by 574 days.

(21) Appl. No.: 18/025,237

(22) PCT Filed: Oct. 7, 2021

(86) PCT No.: PCT/JP2021/037146

§ 371 (c)(1),
(2) Date: Mar. 8, 2023

(87) PCT Pub. No.: WO2022/080226

PCT Pub. Date: Apr. 21, 2022

(65) Prior Publication Data

US 2023/0312403 A1 Oct. 5, 2023

(30) Foreign Application Priority Data

Oct. 15, 2020 (JP) ................................ 2020-173717
Dec. 28, 2020 (JP) ................................ 2020-218402

(51) Int. Cl.
*C03C 10/00* (2006.01)
*C03C 21/00* (2006.01)

(52) U.S. Cl.
CPC ........ *C03C 10/0027* (2013.01); *C03C 21/002* (2013.01)

(58) Field of Classification Search
CPC .......................... C03C 10/0027; C03C 21/002
See application file for complete search history.

(56) References Cited

U.S. PATENT DOCUMENTS

| | | | |
|---|---|---|---|
| 4,438,210 | A | 3/1984 | Rittler |
| 4,455,160 | A | 6/1984 | Rittler |
| 4,461,839 | A | 7/1984 | Rittler |
| 5,017,519 | A | 5/1991 | Morimoto et al. |
| 2004/0157720 | A1 | 8/2004 | Sakamoto et al. |
| 2006/0063009 | A1 | 3/2006 | Naitou et al. |
| 2020/0131080 | A1 * | 4/2020 | Yuan ........................ C03C 3/085 |
| 2020/0156994 | A1 | 5/2020 | Li et al. |
| 2020/0207660 | A1 | 7/2020 | Li et al. |
| 2020/0239354 | A1 | 7/2020 | Li et al. |
| 2020/0346969 | A1 | 11/2020 | Li et al. |
| 2021/0347682 | A1 | 11/2021 | Li et al. |
| 2022/0033298 | A1 | 2/2022 | Yokota et al. |
| 2022/0064054 | A1 | 3/2022 | Li et al. |
| 2023/0031267 | A1 | 2/2023 | Hu et al. |
| 2023/0250015 | A1 | 8/2023 | Li et al. |
| 2024/0270626 | A1 | 8/2024 | Li et al. |

FOREIGN PATENT DOCUMENTS

| | | | |
|---|---|---|---|
| CN | 110627365 | A | 12/2019 |
| CN | 110944954 | A | 3/2020 |
| CN | 110981206 | A | 4/2020 |
| EP | 3950622 | A1 | 2/2022 |
| EP | 4 212 490 | A1 | 7/2023 |
| JP | S59-116150 | A | 7/1984 |
| JP | H02-293345 | A | 12/1990 |
| JP | 2004-099429 | A | 4/2004 |
| JP | 2006-083045 | A | 3/2006 |
| WO | WO-2019-108876 | A1 | 6/2019 |
| WO | WO-2019/167850 | A1 | 9/2019 |
| WO | WO-2020/196171 | A1 | 10/2020 |
| WO | WO-2020-203308 | A1 | 10/2020 |

OTHER PUBLICATIONS

Korean Office Action issued Aug. 29, 2024 in Application No. 10-2023-7012174.
First Chinese Office Action issued Jun. 19, 2024 in Application No. 202180070792.8.
International Search Report mailed Dec. 21, 2021 for PCT/JP2021/037146.
Written Opinion of the International Searching Authority mailed Dec. 21, 2021 for PCT/JP2021/037146.
Korean Office Action issued Jul. 16, 2025 in Application No. 10-2023-7012174.
Extended European Search Report issued Sep. 26, 2024 in Application No. 21879966.6.
Chinese Office Action issued May 20, 2025 in Application No. 202180070792.8.
"Complete Food Packaging", Ed. Chinese Haue, p. 272, Beijing: Chinese Light Industries Press, Mar. 2000.
Second Chinese Office Action issued on Dec. 4, 2024 for corresponding Chinese Patent Application No. 202180070792.8.
Fourth Chinese Office Action issued Mar. 9, 2026 in Application No. 202180070792.8.
Japanese Office Action issued Oct. 1, 2025, in Application No. 2022-556879.

(Continued)

*Primary Examiner* — Benjamin L Utech
(74) *Attorney, Agent, or Firm* — Faegre Drinker Biddle & Reath LLP

(57) ABSTRACT

A crystallized glass contains: from 58 to 70% of $SiO_2$, from 15 to 30% of $Al_2O_3$, from 2 to 10% of $Li_2O$, from 0 to 10% of $Na_2O$, from 0 to 10% of $K_2O$, from 0 to 15% of $Na_2O+K_2O$, from 0 to 15% of MgO+CaO+SiO+BaO+ZnO, from 0.1 to 6% of $SnO_2$, from 0.5 to 6% of $ZrO_2$, from 0 to 4% of $TiO_2$, and from 0 to 6% of $P_2O_5$ in mass %, in which the crystallized glass has a degree of crystallinity of 1 to 95%, and an average visible light transmittance of 50% or greater at a thickness of 0.8 mm and a wavelength of 380 to 780 nm, and a compression stress layer is formed on a surface.

14 Claims, No Drawings

(56) References Cited

OTHER PUBLICATIONS

Chinese Office Action issued Jan. 4, 2026 in Application No. 202180070792.8.
European Communication pursuant to Article 94(3) EPC issued Dec. 1, 2025, in Application No. 21879966.6.

* cited by examiner

CRYSTALLIZED GLASS

TECHNICAL FIELD

The present invention relates to a crystallized glass.

BACKGROUND ART

Mobile phones, digital cameras, personal digital assistants (PDAs), and the like tend to become increasingly popular. In these applications, a cover glass is used to protect the touch panel display (see Patent Document 1).

CITATION LIST

Patent Literature

Patent Document 1: JP 2006-083045 A

SUMMARY OF INVENTION

Technical Problem

Cover glasses, particularly cover glasses for smartphones, are often used outdoors, where light with high illuminance and high parallelism makes it easy to recognize a scratch on the surface, reducing the visibility of the display. Thus, increasing the scratch resistance of the glass becomes important. Increasing the Vickers hardness value is believed to be useful as a method of increasing the scratch resistance. Increasing the Vickers hardness value makes the surface less likely to be scratched and can reduce the width and depth of a hard scratch even if the surface gets a hard scratch.

Glasses with a high Vickers hardness value known in the art include crystallized glasses, in which crystals are precipitated in the glass.

However, crystallized glasses are inferior to amorphous glasses in terms of transparency and are not suitable for cover glasses at present.

An object of the present invention is to provide a crystallized glass having a high Vickers hardness value and excellent transparency.

Solution to Problem

A crystallized glass according to an embodiment of the present invention contains from 58 to 70% of $SiO_2$, from 15 to 30% of $Al_2O_3$, from 2 to 10% of $Li_2O$, from 0 to 10% of $Na_2O$, from 0 to 10% of $K_2O$, from 0 to 15% of $Na_2O+K_2O$, from 0 to 15% of MgO+CaO+SrO+BaO+ZnO, from 0.1 to 6% of $SnO_2$, from 0.5 to 6% of $ZrO_2$, from 0 to 4% of $TiO_2$, and from 0 to 6% of $P_2O_5$ in mass %, in which the crystallized glass has a crystallinity of 1 to 95% and an average visible light transmittance of 50% or greater at a thickness of 0.8 mm and a wavelength of 380 to 780 nm, and a compression stress layer is formed on a surface. Here, "$Na_2O+K_2O$" means a total amount of $Na_2O$ and $K_2O$, and "MgO+CaO+SrO+BaO+ZnO" means a total amount of MgO, CaO, SrO, BaO, and ZnO.

The crystallized glass according to an embodiment of the present invention has a compression stress layer, which can be formed on the surface of the crystallized glass by subjecting a crystallized glass having the composition described above to ion exchange treatment, and is likely to have a high Vickers hardness value.

The crystallized glass according to an embodiment of the present invention preferably contains substantially no $As_2O_3$ and PbO.

In the crystallized glass according to an embodiment of the present invention, one or more crystals selected from a β-eucryptite solid solution, a β-spodumene solid solution, and zirconia are preferably precipitated.

The crystallized glass according to an embodiment of the present invention preferably has an average crystallite size of 1 μm or less.

The crystallized glass according to an embodiment of the present invention preferably has a Vickers hardness value of 540 or greater. Here, "Vickers hardness" is a value measured, in accordance with JIS Z2244-1992, by pressing a Vickers indenter with a load of 100 gf with a Vickers hardness meter and is an average value of 10 measurements.

The crystallized glass according to an embodiment of the present invention preferably has a flexural strength of 100 MPa or greater and a drop height of 5 mm or greater. Here, the "drop height" is a maximum value of height when a 50 mm×50 mm×0.7-mm thick glass sheet placed on a surface plate made of granite maintains the original shape without cracking when a 53-g weight with a Vickers indenter attached to the tip is vertically dropped from a certain height onto the glass.

The crystallized glass according to an embodiment of the present invention preferably has a thermal expansion coefficient of 0 to $120\times10^{-7}$/° C. at 30 to 380° C.

The crystallized glass according to an embodiment of the present invention preferably has a Young's modulus of 80 GPa or greater. Here, "Young's modulus" is a value measured by a known resonance method.

A method for manufacturing a crystallized glass according to an embodiment of the present invention includes:

- preparing a crystallized glass containing from 58 to 70% of $SiO_2$, from 15 to 30% of $Al_2O_3$, from 2 to 10% of $Li_2O$, from 0 to 10% of $Na_2O$, from 0 to 10% of $K_2O$, from 0 to 15% of $Na_2O+K_2O$, from 0 to 15% of MgO+CaO+SrO+BaO+ZnO, from 0.1 to 6% of $SnO_2$, from 0.5 to 6% of $ZrO_2$, from 0 to 4% of $TiO_2$, and from 0 to 6% of $P_2O_5$ in mass %, and having a crystallinity of 1 to 95%; and
- immersing the crystallized glass in a molten salt of 400° C. or higher to obtain a crystallized glass having a compression stress layer on a surface.

A method for manufacturing a crystallized glass according to an embodiment of the present invention includes:

- preparing a crystallized glass containing from 58 to 70% of $SiO_2$, from 15 to 30% of $Al_2O_3$, from 2 to 10% of $Li_2O$, from 0 to 10% of $Na_2O$, from 0 to 10% of $K_2O$, from 0 to 15% of $Na_2O+K_2O$, from 0 to 15% of MgO+CaO+SrO+BaO+ZnO, from 0.1 to 6% of $SnO_2$, from 0.5 to 6% of $ZrO_2$, from 0 to 4% of $TiO_2$, and from 0 to 6% of $P_2O_5$ in mass %, and having a crystallinity of 40 to 95%; and
- immersing the crystallized glass in a molten salt of 500 to 1000° C. to obtain a crystallized glass having a compression stress layer on a surface.

In a crystallized glass according to an embodiment of the present invention, a crystal of zirconia is precipitated, and an average visible light transmittance is 50% or greater at a thickness of 0.8 mm and a wavelength of 380 to 780 nm.

The crystallized glass according to an embodiment of the present invention preferably has a compression stress layer formed on a surface.

The crystallized glass according to an embodiment of the present invention preferably has a crystallinity of less than 40%.

The crystallized glass according to an embodiment of the present invention preferably contains from 58 to 70% of $SiO_2$, from 15 to 30% of $Al_2O_3$, from 2 to 10% of $Li_2O$, from 0 to 10% of $Na_2O$, from 0 to 10% of $K_2O$, from 0 to 15% of $Na_2O+K_2O$, from 0 to 15% of MgO+CaO+SrO+BaO+ZnO, from 0.1 to 6% of $SnO_2$, from 0.5 to 6% of $ZrO_2$, from 0 to 4% of $TiO_2$, and from 0 to 6% of $P_2O_5$ in mass %.

Advantageous Effects of Invention

According to the present invention, the crystallized glass with a high Vickers hardness value and excellent transparency can be provided.

DESCRIPTION OF EMBODIMENTS

A crystallized glass according to an embodiment of the present invention contains from 58 to 70% of $SiO_2$, from 15 to 30% of $Al_2O_3$, from 2 to 10% of $Li_2O$, from 0 to 10% of $Na_2O$, from 0 to 10% of $K_2O$, from 0 to 15% of $Na_2O+K_2O$, from 0 to 15% of MgO+CaO+SrO+BaO+ZnO, from 0.1 to 6% of $SnO_2$, from 0.5 to 6% of $ZrO_2$, from 0 to 4% of $TiO_2$, and from 0 to 6% of $P_2O_5$ in mass %, in which the crystallized glass has a crystallinity of 1 to 95% and an average visible light transmittance of 50% or greater at a thickness of 0.8 mm and a wavelength of 380 to 780 nm, and a compression stress layer is formed on a surface.

First, the reason for limiting the composition of the crystallized glass as described above will be described. In the description below, "%" means "mass %" unless otherwise indicated.

$SiO_2$ is a component that forms a network of glass. The content of $SiO_2$ is from 58 to 70%, preferably from 60 to 68%, and particularly preferably from 64 to 66%. If the content of $SiO_2$ is too low, weather resistance would tend to significantly deteriorate. On the other hand, if the content of $SiO_2$ is too high, the meltability of the glass would likely deteriorate.

$Al_2O_3$ is a component that increases ion exchange performance. The content of $Al_2O_3$ is from 15 to 30%, preferably from 17 to 27%, and particularly preferably from 20 to 25%. If the content of $Al_2O_3$ is too low, coarse crystals would be likely to precipitate, and crystallization would become difficult. On the other hand, if the content of $Al_2O_3$ is too high, the meltability of the glass would likely deteriorate.

$Li_2O$ is a component that increases the meltability of the glass and is also involved in ion exchange treatment. The content of $Li_2O$ is from 2 to 10%, preferably from 3 to 8%, and particularly preferably from 4 to 6%. If the content of $Li_2O$ is too low, the ion exchange would become difficult. On the other hand, if the content of $Li_2O$ is too high, the liquid phase temperature would likely increase, and the crystallite size would tend to be too large.

$Na_2O$ and $K_2O$ are components that increase the meltability of the glass. The content of $Na_2O+K_2O$ is from 0 to 15%, preferably from 0 to 10%, from 0 to 7%, from 0 to 5%, from 0 to 3%, from 0 to 2%, and particularly preferably from 0 to 1%. If the content of $Na_2O+K_2O$ is too high, the transmittance of the crystallized glass would likely decrease. The content of $Na_2O$ is from 0 to 10%, preferably from 0 to 7%, from 0 to 5%, from 0 to 3%, from 0 to 2%, and particularly preferably from 0 to 1%, and the content of $K_2O$ is from 0 to 10%, preferably from 0 to 7%, from 0 to 5%, from 0 to 3%, from 0 to 2%, and particularly preferably from 0 to 1%.

MgO, CaO, SrO, BaO, ZnO are components that increase the meltability of the glass. The content of MgO+CaO+SrO+BaO+ZnO is preferably from 0 to 15%, preferably from 0 to 13%, from 0 to 10%, from 0 to 7%, from 0 to 5%, from 0 to 4%, and particularly preferably from 0 to 3%. If the content of MgO+CaO+SrO+BaO+ZnO is too high, coarse crystals would be likely to precipitate. The content of MgO is preferably from 0 to 10%, from 0 to 7%, from 0 to 5%, from 0 to 4%, and particularly preferably from 0 to 3%, the content of CaO is preferably from 0 to 10%, from 0 to 7%, from 0 to 5%, from 0 to 4%, and particularly preferably from 0 to 3%, the content of SrO is preferably from 0 to 10%, from 0 to 7%, from 0 to 5%, from 0 to 4%, and particularly preferably from 0 to 3%, the content of BaO is preferably from 0 to 10%, from 0 to 7%, from 0 to 5%, from 0 to 4%, and particularly preferably from 0 to 3%, and the content of ZnO is preferably from 0 to 10%, from 0 to 7%, from 0 to 5%, from 0 to 4%, and particularly preferably from 0 to 3%.

$SnO_2$ is a component that acts as a fining agent. In addition, it is also a component necessary to efficiently precipitate crystals in a crystallization step. On the other hand, it is also a component that would significantly enhance the coloration of the glass if contained in a large amount. The content of $SnO_2$ is from 0.1 to 6%, preferably from 1 to 5%, and particularly preferably from 1.5 to 4%. If the content of $SnO_2$ is too low, fining the glass would become difficult, and productivity would likely decrease. In addition, crystal nuclei would not be sufficiently formed, and coarse crystals may precipitate, causing white turbidity and/or breakage in the glass. On the other hand, if the content of $SnO_2$ is too high, the coloration of the crystallized glass may be enhanced. Furthermore, the amount of evaporation of $SnO_2$ during the manufacturing would increase, tending to increase environmental burden.

$ZrO_2$ is a nucleation component to precipitate crystals in a crystallization step. The content of $ZrO_2$ is from 0.5 to 6%, preferably from 1 to 4%, and particularly preferably from 1.5 to 3%. If the content of $ZrO_2$ is too low, crystal nuclei would not be sufficiently formed, and coarse crystals may precipitate, causing white turbidity and/or breakage in the glass. On the other hand, if the content of $ZrO_2$ is too high, coarse $ZrO_2$ crystals would precipitate, the glass would be prone to devitrification, and the crystallized glass would be prone to breakage.

The content of $SnO_2+ZrO_2$ is preferably from 1.5% to 12%, from 2 to 9%, and particularly preferably from 3 to 7%. If the content of $SnO_2+ZrO_2$ is too low, crystal nuclei would be less likely to precipitate, making crystallization difficult. On the other hand, if the content of $SnO_2+ZrO_2$ is too high, crystal nuclei would become large, likely causing white turbidity in the crystallized glass.

$SnO_2$ has an effect of promoting phase separation of $ZrO_2$. To allow phase separation to occur efficiently while maintaining a low liquid phase temperature (while reducing the risk of devitrification due to initial phase precipitation) and to allow rapid nucleation and crystal growth in a later step, $SnO_2/(SnO_2+ZrO_2)$ is preferably from 0.3 to 0.7, from 0.35 to 0.65, and particularly preferably from 0.4 to 0.6 in a mass ratio.

$TiO_2$ is a nucleation component to precipitate crystals in a crystallization step. On the other hand, it would significantly enhance the coloration of the glass if contained in a large amount. In particular, zirconia titanate-based crystals containing $ZrO_2$ and $TiO_2$ act as crystalline nuclei but are involved in the coloration of the crystallized glass as the electrons transition from the valence band of the ligand, oxygen, to the conduction band of the central metals, zirconia and titanium, (LMCT transition). In addition, if titanium remains in the residual glass phase, the LMCT transition could occur from the valence band of $SiO_2$ network to the conduction band of tetravalent titanium of the residual glass phase. Furthermore, the d-d transition would occur in trivalent titanium of the residual glass phase and be involved in the coloration of the crystallized glass. Moreover, in the coexistence of titanium and iron, ilmenite $(FeTiO)_3$)-like coloration would develop. Still more, the coexistence of titanium and tin is known to enhance yellow color. Thus, the content of $TiO_2$ is from 0 to 4%, preferably from 0 to 3%, from 0 to 2%, from 0 to 1%, and particularly preferably from 0 to 0.1%. However, $TiO_2$ is easily mixed as an impurity. Thus, an attempt to completely remove $TiO_2$ would make a raw batch expensive and tend to increase the manufacturing cost. To prevent the increase in the manufacturing cost, the lower limit of the content of $TiO_2$ is preferably 0.0003% or greater, 0.001% or greater, 0.01% or greater, and particularly preferably 0.02% or greater.

$P_2O_5$ is a component that prevents precipitation of coarse $ZrO_2$ crystals. The content of $P_2O_5$ is from 0 to 6%, preferably from 0 to 5%, from 0.1 to 5%, from 0.5 to 4%, and particularly preferably from 1 to 3%. If the content of $P_2O_5$ is too high, the thermal expansion coefficient would tend to increase.

The crystallized glass according to an embodiment of the present invention may contain a component of the following in the glass composition in addition to the above components.

$B_2O_3$ is a component that reduces the viscosity of the glass and improves the meltability and formability of the glass. In addition, it is a component that can be involved in facilitating the occurrence of phase separation in crystal nucleation. The content of $B_2O_3$ is preferably from 0 to 3%, from 0 to 2%, from 0 to 1%, and particularly preferably from 0 to 0.1%. If the content of $B_2O_3$ is too high, the amount of evaporation of $B_2O_3$ during melting would increase and increase the environmental burden.

$CeO_2$ is a component that does not only improve the solubility but also has an effect as an oxidizing agent and prevents the increase of an impurity $Fe^{2+}$ in total Fe and increases the transparency of the crystallized glass. The content of $CeO_2$ is preferably from 0 to 0.5%, from 0 to 0.5%, and particularly preferably from 0 to 0.3%. If the content of $CeO_2$ is too high, the coloration due to $Ce^{4+}$ would become too strong, and this may develop brown color in the crystallized glass.

$SO_3$ can be introduced from mirabilite. The effect of $SO_3$ is improving the solubility of raw glass. In addition, it functions as an oxidizing agent similarly to $CeO_2$, and its coexistence with $CeO_2$ significantly exhibits the effect. The content of $SO_3$ is preferably from 0 to 0.5%, from 0.02 to 0.5%, and particularly preferably from 0.05 to 0.3%. If the amount of $SO_3$ is too large, heterogeneous crystals may precipitate and deteriorate the surface quality of the crystallized glass.

$As_2O_3$ and PbO are harmful and thus are preferably substantially not contained. Here, "substantially not contained" means not intentionally adding these components in the glass and does not mean completely excluding even an unavoidable impurity. More objectively, this expression means that the content of these components including impurities is 1000 ppm or lower.

In the crystallized glass according to an embodiment of the present invention, one or more crystals selected from a β-eucryptite solid solution, a β-spodumene solid solution, and zirconia are preferably precipitated. Precipitation of any one crystal selected from a β-eucryptite solid solution, a β-spodumene solid solution, and zirconia increases a Vickers hardness value and chemical durability of the crystallized glass. In an embodiment of the present invention, however, precipitation of crystals other than those of a β-eucryptite solid solution, a β-spodumene solid solution, and zirconia is not excluded. In addition, the β-eucryptite solid solution, β-spodumene solid solution, and zirconia are preferably main crystals but do not necessarily need to be main crystals.

In addition, in the crystallized glass according to an embodiment of the present invention, when the crystallinity is as low as less than 40%, zirconia is preferably precipitated, and in particular, zirconia is preferably a main crystal. When zirconia is the main crystal, it has advantages of leaving a large amount of glass phase because of its small crystal grain size and facilitating ion exchange. Facilitating ion exchange and introducing a strong surface stress likely enhance mechanical properties, such as Vickers hardness and strength. Furthermore, leaving a large amount of glass phase facilitates making a smooth surface, thus providing a major advantage of increasing flexural strength.

The crystallized glass according to an embodiment of the present invention preferably has a crystallinity of 1 to 95%, of 1 to 50%, of 2 to 40%, of 3 to 35%, of 4 to 30%, and particularly preferably of 5 to 20%. If the crystallinity is too low, the Vickers hardness value and the Young's modulus would tend to decrease. On the other hand, if the crystallinity is too high, the transmittance would likely decrease. In addition, when ion exchange is performed, the ratio of the glass phase to be subjected to ion exchange treatment is small, and thus this would make it difficult to form a high-compression stress layer by ion exchange treatment unless special conditions as described later are adopted.

On the other hand, for a crystallized glass with a high crystallinity, a high-compression stress layer can be formed by ion exchange at 500° C. or higher using a molten salt with a high boiling point, such as, for example, a sulfate, a carbonate, or a chloride salt. When a high-compression stress layer can be thus formed, the crystallinity is preferably 40% or greater, 50% or greater, 60% or greater, 70% or greater, 75% or greater, 78% or greater, 80% or greater, 81% or greater, 83% or greater, 85% or greater, 87% or greater, 90% or greater, 92% or greater, and particularly preferably 93% or greater, and this makes it easy to achieve both a high-compression stress layer and a high Young's modulus.

The crystallized glass according to an embodiment of the present invention preferably has a crystallite size of 1 μm or less, 0.5 μm or less, and particularly preferably 0.3 μm or less. If the crystallite size is too large, the transmittance would likely decrease. The lower limit of the crystallite size is not particularly limited but is practically 1 nm or greater.

The crystallized glass according to an embodiment of the present invention has an average visible light transmittance of 50% or greater, preferably 55% or greater, 60% or greater, 65% or greater, 70% or greater, 75% or greater, 80% or greater, 81% or greater, 82% or greater, 83% or greater, 84% or greater, 85% or greater, 86% or greater, 87% or greater, 88% or greater, 89% or greater, 90% or greater, and particularly preferably 91% or greater at a thickness of 0.8 mm and a wavelength of 380 to 780 nm. If the transmittance is too low, the crystallized glass would become difficult to be used as a cover glass for a smartphone.

The crystallized glass according to an embodiment of the present invention preferably has a whiteness L* value of 50 or less, 40 or less, and particularly preferably 30 or less. If the whiteness is too high, the transmittance would likely decrease. The whiteness L* value means the value defined in JIS Z 8730.

The crystallized glass according to an embodiment of the present invention preferably has a Vickers hardness value of 540 or greater, 550 or greater, and particularly preferably 560 or greater. If the Vickers hardness value is too low, the glass surface would be prone to scratches. The upper limit of the Vickers hardness value is not particularly limited but is practically 1000 or less.

The crystallized glass according to an embodiment of the present invention preferably has a Young's modulus of 70 GPa or greater, 74 GPa or greater, 75 GPa or greater, 80 GPa or greater, 85 GPa or greater, 87 GPa or greater, 89 GPa or greater, 90 GPa or greater, 93 GPa or greater, and particularly preferably 95 GPa or greater. If the Young's modulus is too low, the cover glass would be prone to flexion when the sheet thickness is small. The upper limit is not particularly limited but is practically 200 GPa or less, 150 GPa or less, 120 GPa or less, and particularly 110 GPa or less.

The crystallized glass according to an embodiment of the present invention preferably has a compression stress value (CS) of 50 MPa or greater, 70 MPa or greater, 80 MPa or greater, 90 MPa or greater, 100 MPa or greater, 120 MPa or greater, 150 MPa or greater, 180 MPa or greater, 200 MPa or greater, 230 MPa or greater, 250 MPa or greater, 260 MPa or greater, 280 MPa or greater, and particularly preferably 300 MPa or greater. If the compression stress value is too small, the Vickers hardness and the flexural strength may decrease.

The crystallized glass according to an embodiment of the present invention preferably has a depth of compression stress (DOC) of 10 μm or greater, 20 μm or greater, 30 μm or greater, 40 μm or greater, 50 μm or greater, 60 μm or greater, 70 μm or greater, 80 μm or greater, 90 μm or greater, 100 μm or greater, 110 μm or greater, and particularly preferably 120 μm or greater. If the depth of compression stress is too small, the drop height may be reduced.

The crystallized glass according to an embodiment of the present invention preferably has a flexural strength of 100 MPa or greater, 105 MPa or greater, 110 MPa or greater, and particularly preferably 120 MPa or greater. If the flexural strength is too low, the crystallized glass would be prone to crack. The upper limit of the flexural strength is not particularly limited but is practically 2000 MPa or less.

The crystallized glass according to an embodiment of the present invention preferably has a scratch four-point flexural strength of 150 MPa or greater, 160 MPa or greater, 165 MPa or greater, 170 MPa or greater, 180 MPa or greater, 190 MPa or greater, 210 MPa or greater, 220 MPa or greater, 230 MPa or greater, 235 MPa or greater, 240 MPa or greater, 245 MPa or greater, and particularly preferably 250 MPa or greater. If the scratch four-point flexural strength is too low, the crystallized glass would be prone to crack when used as a cover glass for a smartphone and dropped. The upper limit of the scratch four-point flexural strength is not particularly limited but is practically 1500 MPa or less.

The crystallized glass according to an embodiment of the present invention preferably has a drop height of 5 mm or greater, 7 mm or greater, and particularly preferably 10 mm or greater. If the drop height is too low, the crystallized glass would be prone to crack.

The crystallized glass according to an embodiment of the present invention preferably has a strain point of 500° C. or higher and particularly preferably 530° C. or higher. If the strain point is too low, the glass may deform in a crystallization step.

The crystallized glass according to an embodiment of the present invention preferably has a thermal expansion coefficient at 30 to 380° C. of 0 to $120\times10^{-7}$/° C., of 10 to $110\times10^{-7}$/° C., and particularly preferably of 20 to $100\times10^{-7}$/° C. If the thermal expansion coefficient is too low, the thermal expansion coefficient would be less likely to match that of a peripheral member. On the other hand, if the thermal expansion coefficient is too high, the thermal shock resistance would likely decrease.

Next, a method for manufacturing a crystallized glass according to an embodiment of the present invention will be described.

First, glass raw materials are blended to give a desired composition. The blended raw material batch is then melted at 1400 to 1600° C. for 8 to 16 hours and formed into a predetermined shape to obtain a crystallizable glass body. For the formation, a known forming method can be employed, such as a float method, an overflow method, a down-draw method, a roll-out method, or a mold press method. Processing, such as bending, may be performed as necessary.

Then, to obtain a desired crystallinity, the crystallizable glass body is heat-treated at 700 to 840° C. for 0.1 to 15 hours to precipitate any one or two or more selected from a β-eucryptite solid solution, a β-spodumene solid solution, and zirconia as precipitated crystals, and a transparent crystallized glass is obtained. A crystal other than these two may be precipitated. The heat treatment may be performed only at a specific temperature, or the crystallizable glass body may be heat-treated stepwise by maintaining the temperature at two or more levels or may be heated with a temperature gradient. In addition, crystallization may be promoted by application or irradiation with a sound wave or an electromagnetic wave.

In a case where crystallizing a thin crystallizable glass may cause warpage, a crystallized glass with a desired thickness can be obtained by polishing the crystallized glass. From the viewpoint of the manufacturing cost, polishing need not be performed after crystallizing the crystallizable glass with a desired thickness.

The crystallized glass is then subjected to ion exchange to further increase the Vickers hardness value. In the ion exchange, the crystallized glass body is brought into contact with a molten salt of 400° C. or higher to replace alkali ions (e.g., Li ions) in the glass phase on the surface by alkali ions with a larger ionic radius (e.g., Na ions or K ions) than that of the above alkali ions. A compression stress layer with a compression stress value of 50 MPa or greater and a depth of compression stress of 50 μm or greater can be thus formed on the crystallized glass surface. The "compression stress value" and the "depth of compression stress" refer to values measured by micro-laser Raman spectroscopy.

The molten salt that can be used include nitrates (such as potassium nitrate, sodium nitrate, and lithium nitrate), carbonates (such as potassium carbonate, sodium carbonate, and lithium carbonate), sulfates (such as potassium sulfate, sodium sulfate, and lithium sulfate), chloride salts (such as potassium chloride, sodium chloride, and lithium chloride), and combinations of these.

For a crystallized glass body with a low crystallinity of less than 40%, a salt with a low melting point, such as a nitrate, is preferably used as the molten salt, and sodium nitrate is particularly preferably used. The ion exchange temperature is preferably from 330 to 550° C., from 350 to 500° C., and particularly preferably from 390 to 450° C., and the ion exchange time is preferably from 30 minutes to 12 hours, from 45 minutes to 10 hours, from 1 hour to 8 hours, from 1 hour to 6 hours, and particularly preferably from 1 hour to 4 hours.

For a crystallized glass body with a high crystallinity of 40% or greater, a salt with a high boiling point, such as a sulfate, a carbonate, or a chloride salt, is preferably used as the molten salt, the ion exchange temperature is preferably from 500 to 1000° C., from 600 to 980° C., and particularly preferably from 700 to 950° C., and the ion exchange time is preferably from 1 to 12 hours, from 2 to 10 hours, and particularly preferably from 4 to 8 hours.

For a crystallized glass body with a high crystallinity of 40% or greater, a jig made of a material with high heat resistance and chemical durability, such as titanium, molybdenum, Hastelloy C22, SUS440C, Inconel, Incoloy, or alumina, is preferably used as a jig to set the glass when the glass is immersed in a high-temperature molten salt. In addition, a material subjected to thermal spraying, such as CoNiCrAlY thermal spraying or zirconia thermal spraying, to increase heat resistance and chemical durability may be used as the jig.

Surface processing, such as film attaching, or machining, such as cutting and/or drilling, may be performed as necessary before or after ion exchange.

Example 1

The present invention will be described in detail below based on examples. Table 1 shows Examples 1 to 4 and Comparative Examples 5 and 6.

Crystallized glasses of Examples 1 to 4 and Comparative Examples 5 and 6 were produced as follows.

First, a batch raw material prepared to give any of the compositions in the table was placed into a melting kiln, melted at 1500 to 1600° C., then the molten glass raw material was roll-formed and then annealed, and a crystallizable glass of 900×1200×7 mm was produced. This crystallizable glass was heat-treated at the temperature for the time described in the table, and a crystallized glass was obtained accordingly. For Comparative Example 6, the crystallizable glass was not heat-treated and not crystallized.

For Examples 1 to 4 and Comparative Example 5, the crystallized glass was immersed in $NaNO_3$ molten salt maintained at 430° C. for 4 hours to perform ion exchange treatment, and a chemically strengthened crystallized glass was obtained. For Comparative Example 6, the crystallizable glass was not subjected to ion exchange treatment.

The sample thus produced was evaluated for crystallinity, average crystallite size, precipitated crystal, transmittance, Vickers hardness value, flexural strength, drop height, and thermal expansion coefficient. The results are shown in Table 1.

The crystallinity, average crystallite size, and precipitated crystal were evaluated using an X-ray diffractometer (fully automatic multipurpose horizontal X-ray diffractometer Smart Lab available from Rigaku Corporation). The precipitated crystal was evaluated using analysis software installed in the diffractometer package with a scanning mode of 2θ/θ measurement, a scanning type of continuous scanning, scattering and divergence slit widths of 1°, a light receiving slit width of 0.2°, a measurement range of 10 to 60°, a measurement step of 0.1°, and a scanning rate of

TABLE 1

| mass % | | 1 | 2 | 3 | 4 | 5 | 6 |
|---|---|---|---|---|---|---|---|
| $SiO_2$ | | 66 | 63 | 67 | 63 | 66 | 66 |
| $Al_2O_3$ | | 22 | 22 | 23 | 23 | 22 | 22 |
| $B_2O_3$ | | | | | | | |
| MgO | | 1 | | | | 1 | 1 |
| CaO | | | | | | | |
| SrO | | | 1 | | | | |
| BaO | | 1 | | | | 1 | 1 |
| ZnO | | | | | 4 | | |
| $Li_2O$ | | 4 | 4.5 | 4.5 | 4.5 | 4 | 4 |
| $Na_2O$ | | | 2 | | | | |
| $K_2O$ | | | | | | | |
| $TiO_2$ | | 2 | | | | 2 | 2 |
| $ZrO_2$ | | 2 | 2.5 | 2.5 | 2.5 | 2 | 2 |
| $P_2O_5$ | | 1.5 | 3 | 1.5 | 1.5 | 1.5 | 1.5 |
| $SnO_2$ | | 0.5 | 2 | 1.5 | 1.5 | 0.5 | 0.5 |
| Heat treatment conditions | Temp. (° C.) | 780 | 780 | 780 | 780 | — | 780 |
| | Time (min) | 360 | 360 | 360 | 240 | — | 360 |
| Crystallinity (%) | | 10 | 25 | 25 | 15 | 0 | 25 |
| Average crystallite size (nm) | | 20 | 15 | 50 | 60 | Not measured | 15 |
| Precipitated crystal | | β-Eucryptite solid solution β-Spodumene solid solution | β-Eucryptite solid solution β-Spodumene solid solution | β-Eucryptite solid solution β-Spodumene solid solution | β-Eucryptite solid solution β-Spodumene solid solution | — | β-Eucryptite solid solution β-Spodumene solid solution |
| Transmittance (%) | | 90 | 90 | 89 | 86 | Not measured | 90 |
| Vickers hardness value | | 740 | 730 | 720 | 750 | 500 | 530 |
| Flexural strength (Mpa) | | 710 | Not measured | Not measured | Not measured | Not measured | Not measured |
| Drop height (mm) | | 30 | 30 | Not measured | Not measured | Not measured | Not measured |
| Thermal expansion coefficient ($\times 10^{-7}$/° C.) | | 35 | 32 | 5 | 15 | Not measured | Not measured |

5°/min. In addition, the average crystallite size of the precipitated crystal was calculated using the measured X-ray diffraction peak based on the Debye-Scherrer method. The scanning rate was 1°/min in the measurement for calculating the average crystallite size. Furthermore, the crystallinity was calculated by (integrated intensity of the X-ray diffraction peak of the crystal)/(total integrated intensity of the measured X-ray diffraction)×100 [%] based on the X-ray diffraction profile obtained by the above method.

The average visible light transmittance at a wavelength of 380 to 780 nm was measured using a spectrophotometer for a crystallized glass sheet that was optically polished on both sides to a thickness of 0.8 mm. A spectrophotometer V-670 available from JASCO Corporation was used for the measurement.

The Vickers hardness value is a value measured, in accordance with JIS Z2244-1992, by pressing a Vickers indenter with a load of 100 gf with a Vickers hardness meter and is an average value of 10 measurements.

The flexural strength was measured using a three-point load method similar to ASTM C880-78.

The drop height was determined by a drop test. The drop test was performed by placing a 50 mm×50 mm×0.7-mm thick crystallized glass sheet on a surface plate made of granite and vertically dropping a 53-g weight with a Vickers indenter attached to the tip from a certain height onto the glass. As a result, a maximum value of height when the original shape was maintained without cracking was determined as the drop height.

The thermal expansion coefficient was measured in a temperature range from 30 to 380° C. using a crystallized glass sample processed to 20 mm×3.8 mmφ. A Dilatometer available from NETZSCH was used for the measurement.

Examples 1 to 4 of the present invention were crystallized glasses with a crystallinity of 10 to 25% and had a high transmittance of 86% or greater and a high Vickers hardness value of 720 or greater. On the other hand, Comparative Example 5 was an amorphous glass and thus had a low Vickers hardness value of 500. Comparative Example 6 was not subjected to ion exchange and thus had a low Vickers hardness value of 530.

Example 2

Tables 2 to 9 show Examples A to AK of the present invention.

TABLE 2

| mass % | | | A | B | C |
|---|---|---|---|---|---|
| $SiO_2$ | | | 67.9 | 67.9 | 67.9 |
| $Al_2O_3$ | | | 22.3 | 22.3 | 22.3 |
| $B_2O_3$ | | | 0 | 0 | 0 |
| MgO | | | 1.25 | 1.25 | 1.25 |
| CaO | | | 0 | 0 | 0 |
| SrO | | | 0 | 0 | 0 |
| BaO | | | 0 | 0 | 0 |
| ZnO | | | 0 | 0 | 0 |
| $Li_2O$ | | | 3.68 | 3.68 | 3.68 |
| $Na_2O$ | | | 0.67 | 0.67 | 0.67 |
| $K_2O$ | | | 0 | 0 | 0 |
| $TiO_2$ | | | 0 | 0 | 0 |
| $ZrO_2$ | | | 2.62 | 2.62 | 2.62 |
| $P_2O_5$ | | | 0.40 | 0.40 | 0.40 |
| $SnO_2$ | | | 1.13 | 1.13 | 1.13 |
| Heat treatment conditions | 1st step | Temp. (° C.) | 780 | 780 | 780 |
| | | Time (min) | 360 | 360 | 360 |
| | 2nd step | Temp. (° C.) | 890 | 890 | 890 |
| | | Time (min) | 60 | 60 | 60 |
| Crystallinity (%) | | | 90 | 90 | 90 |
| Average crystallite size (nm) | | | Not measured | Not measured | Not measured |
| Precipitated crystal | | | β-Eucryptite solid solution β-Spodumene solid solution | β-Eucryptite solid solution β-Spodumene solid solution | β-Eucryptite solid solution β-Spodumene solid solution |
| Transmittance (%) | | | 91 | 91 | 91 |
| Thermal expansion coefficient ($\times 10^{-7}$/° C.) | | | −0.2 | −0.2 | −0.2 |
| Young's modulus (GPa) | | | 93 | 93 | 93 |
| Chemical strengthening | Strengthening solution | | $Li_2SO_4$ (100 wt. %) | $KCl/Li_2SO_4$ mixed salt (54 wt. %/48 wt. %) | $KCl/Li_2SO_4$ mixed salt (40 wt. %/60 wt. %) |
| | Temp. (° C.) | | 950 | 750 | 750 |
| | Time (min) | | 120 | 240 | 120 |
| | CS (MPa) | | 262 | 312 | Not measured |
| | DOC (um) | | 107 | 113 | Not measured |

TABLE 3

| mass % | D | E | F | G | H |
|---|---|---|---|---|---|
| $SiO_2$ | 65.9 | 64.7 | 65.6 | 65.1 | 66.2 |
| $Al_2O_3$ | 22.3 | 21.9 | 22.2 | 22 | 22.4 |
| $B_2O_3$ | 0 | 0 | 0 | 0.01 | 0 |
| MgO | 0.7 | 0.69 | 0.2 | 0.4 | 0.69 |

TABLE 3-continued

| mass % | | | D | E | F | G | H |
|---|---|---|---|---|---|---|---|
| $CaO$ | | | 0 | 0 | 0 | 0 | 0 |
| $SrO$ | | | 0 | 0 | 0 | 0 | 0.01 |
| $BaO$ | | | 1.2 | 1.18 | 1.18 | 1.18 | 0 |
| $ZnO$ | | | 0 | 0 | 0 | 0 | 0 |
| $Li_2O$ | | | 3.71 | 3.64 | 3.7 | 4.1 | 3.74 |
| $Na_2O$ | | | 0.4 | 0.39 | 0.39 | 0.39 | 0.38 |
| $K_2O$ | | | 0.3 | 0.3 | 0.3 | 0.3 | 0 |
| $TiO_2$ | | | 0.0023 | 0.0044 | 0.0015 | 0.003 | 0.0031 |
| $ZrO_2$ | | | 3.39 | 4.06 | 3.7 | 3.7 | 3.84 |
| $P_2O_5$ | | | 1.4 | 1.38 | 1.38 | 1.38 | 1.39 |
| $SnO_2$ | | | 0.69 | 1.81 | 1.4 | 1.4 | 1.34 |
| Heat treatment conditions | 1st step | Temp. (° C.) | 810 | 810 | 810 | 810 | 840 |
| | | Time (hrs) | 60 | 60 | 20 | 20 | 3 |
| | 2nd step | Temp. (° C.) | 920 | 920 | 920 | 920 | 890 |
| | | Time (hrs) | 3 | 3 | 3 | 3 | 1 |
| Crystallinity (%) | | | ≥40 | ≥40 | ≥40 | ≥40 | ≥40 |
| Average crystallite size (nm) | | | Not measured | Not measured | 45 | Not measured | 45 |
| Precipitated crystal | | | β-Eucryptite solid solution — | β-Eucryptite solid solution — | β-Eucryptite solid solution — | β-Eucryptite solid solution — | β-Eucryptite solid solution — |
| Transmittance (%) | | | >70 | >84 | >86 | >84 | >83 |
| Thermal expansion coefficient ($\times 10^{-7}$/° C.) | | | −0.9 | −0.4 | Not measured | Not measured | −5 |
| Young's modulus (GPa) | | | 92 | 93 | Not measured | Not measured | Not measured |
| Chemical strengthening | Strengthening solution | | KCl/NaCl mixed salt (83.6 wt. %/ 16.4 wt. %) | KCl/NaCl mixed salt (83.6 wt. %/ 16.4 wt. %) | KCl/NaCl mixed salt (83.6 wt. %/ 16.4 wt. %) | KCl/NaCl mixed salt (83.6 wt. %/ 16.4 wt. %) | KCl/NaCl mixed salt (83.6 wt. %/ 16.4 wt. %) |
| | Temp. (° C.) | | 720 | 720 | 720 | 720 | 720 |
| | Time (min) | | 240 | 240 | 240 | 240 | 240 |
| | CS (MPa) | | Not measured | Not measured | Not measured | Not measured | Not measured |
| | DOC (μm) | | Not measured | Not measured | Not measured | Not measured | Not measured |

TABLE 4

| mass % | | | I | J | K | L | M |
|---|---|---|---|---|---|---|---|
| $SiO_2$ | | | 66.7 | 65.9 | 67.2 | 66.1 | 68 |
| $Al_2O_3$ | | | 22.2 | 22.2 | 21.6 | 21.7 | 22.6 |
| $B_2O_3$ | | | 0.82 | 0 | 0 | 0 | 0 |
| $MgO$ | | | 0 | 1.52 | 1.23 | 0.68 | 0.4 |
| $CaO$ | | | 0.02 | 0.35 | 0 | 0.03 | 0.02 |
| $SrO$ | | | 0.34 | 0.001 | 0 | 0.43 | 0 |
| $BaO$ | | | 0.48 | 0 | 0.3 | 1.16 | 0 |
| $ZnO$ | | | 1.66 | 0.01 | 0.01 | 0 | 0.9 |
| $Li_2O$ | | | 2.2 | 4.02 | 3.3 | 3.63 | 3.74 |
| $Na_2O$ | | | 0.01 | 0.37 | 0.37 | 0.41 | 0.09 |
| $K_2O$ | | | 0.01 | 0 | 0 | 0.02 | 0 |
| $TiO_2$ | | | 0 | 0.008 | 0.156 | 0.0235 | 0.0141 |
| $ZrO_2$ | | | 3.9 | 3.9 | 1.89 | 3.01 | 3.06 |
| $P_2O_5$ | | | 0 | 1.4 | 1.41 | 1.36 | 0 |
| $SnO_2$ | | | 1.63 | 0.45 | 1.18 | 1.21 | 1.22 |
| Heat treatment conditions | 1st step | Temp. (° C.) | 840 | 780 | 780 | 810 | 780 |
| | | Time (hrs) | 30 | 3 | 12 | 3 | 3 |
| | 2nd step | Temp. (° C.) | 890 | 890 | 890 | 920 | 890 |
| | | Time (hrs) | 3 | 1 | 1 | 1 | 1 |
| Crystallinity (%) | | | ≥40 | ≥40 | ≥40 | ≥40 | ≥40 |
| Average crystallite size (nm) | | | Not measured | Not measured | Not measured | Not measured | Not measured |
| Precipitated crystal | | | β-Eucryptite solid solution — | β-Eucryptite solid solution — | β-Eucryptite solid solution — | β-Eucryptite solid solution — | β-Eucryptite solid solution — |
| Transmittance (%) | | | Not measured | Not measured | Not measured | >76 | >81 |
| Thermal expansion coefficient ($\times 10^{-7}$/° C.) | | | Not measured | −1.3 | −0.8 | −5 | −2.5 |
| Young's modulus (GPa) | | | Not measured | Not measured | Not measured | Not measured | Not measured |

TABLE 4-continued

| mass % | | I | J | K | L | M |
|---|---|---|---|---|---|---|
| Chemical strengthening | Strengthening solution | KCl/NaCl mixed salt (83.6 wt. %/ 16.4 wt. %) | KCl/NaCl mixed salt (83.6 wt. %/ 16.4 wt. %) | KCl/NaCl mixed salt (83.6 wt. %/ 16.4 wt. %) | KCl/NaCl mixed salt (83.6 wt. %/ 16.4 wt. %) | KCl/NaCl mixed salt (83.6 wt. %/ 16.4 wt. %) |
| | Temp. (° C.) | 720 | 720 | 720 | 720 | 720 |
| | Time (min) | 240 | 240 | 240 | 240 | 240 |
| | CS (MPa) | Not measured | Not measured | Not measured | Not measured | Not measured |
| | DOC (μm) | Not measured | Not measured | Not measured | Not measured | Not measured |

TABLE 5

| mass % | | | N | O | P | Q | R |
|---|---|---|---|---|---|---|---|
| | $SiO_2$ | | 65.7 | 66.5 | 66.5 | 66.2 | 67 |
| | $Al_2O_3$ | | 21.9 | 21.8 | 22 | 22.2 | 22.3 |
| | $B_2O_3$ | | 0.6 | 0 | 0 | 0 | 0 |
| | MgO | | 1.23 | 0.69 | 1.2 | 1.2 | 1.17 |
| | CaO | | 0.1 | 0 | 0 | 0 | 0 |
| | SrO | | 0 | 0 | 0.01 | 0 | 0 |
| | BaO | | 0 | 1.18 | 0 | 1.2 | 0.0008 |
| | ZnO | | 0 | 0.01 | 0 | 0 | 0 |
| | $Li_2O$ | | 3.64 | 3.63 | 3.5 | 2.35 | 3.68 |
| | $Na_2O$ | | 0.07 | 0.41 | 0.4 | 0.4 | 0.39 |
| | $K_2O$ | | 0 | 0 | 0 | 0.3 | 0.0032 |
| | $TiO_2$ | | 0.0385 | 0.0182 | 0.0058 | 0.0072 | 0.0058 |
| | $ZrO_2$ | | 3.06 | 2.95 | 3 | 2.99 | 2.73 |
| | $P_2O_5$ | | 2.55 | 1.4 | 1.42 | 1.4 | 1.36 |
| | $SnO_2$ | | 1.25 | 1.36 | 1.33 | 1.3 | 1.19 |
| Heat treatment conditions | 1st step | Temp. (° C.) | 780 | 780 | 780 | 840 | 780 |
| | | Time (hrs) | 3 | 3 | 3 | 1.5 | 3 |
| | 2nd step | Temp. (° C.) | 890 | 905 | 890 | 920 | 890 |
| | | Time (hrs) | 1 | 1 | 1 | 1 | 1 |
| Crystallinity (%) | | | ≥40 | ≥40 | ≥40 | ≥40 | ≥40 |
| Average crystallite size (nm) | | | Not measured | 38 | 41 | Not measured | Not measured |
| Precipitated crystal | | | β-Eucryptite solid solution — | β-Eucryptite solid solution — | β-Eucryptite solid solution — | β-Eucryptite solid solution — | β-Eucryptite solid solution — |
| Transmittance (%) | | | >83 | >89 | >89 | Not measured | Not measured |
| Thermal expansion coefficient ($\times 10^{-7}$/° C.) | | | −2.4 | −5 | −1.7 | 12 | Not measured |
| Young's modulus (GPa) | | | Not measured | Not measured | Not measured | Not measured | 93 |
| Chemical strengthening | Strengthening solution | | KCl/NaCl mixed salt (83.6 wt. %/ 16.4 wt. %) | KCl/NaCl mixed salt (83.6 wt. %/ 16.4 wt. %) | KCl/NaCl mixed salt (83.6 wt. %/ 16.4 wt. %) | KCl/NaCl mixed salt (83.6 wt. %/ 16.4 wt. %) | KCl/NaCl mixed salt (83.6 wt. %/ 16.4 wt. %) |
| | Temp. (° C.) | | 720 | 720 | 720 | 720 | 720 |
| | Time (min) | | 240 | 240 | 240 | 240 | 240 |
| | CS (MPa) | | Not measured | Not measured | Not measured | Not measured | Not measured |
| | DOC (μm) | | Not measured | Not measured | Not measured | Not measured | Not measured |

TABLE 6

| mass % | S | T | U | V | W |
|---|---|---|---|---|---|
| $SiO_2$ | 65.2 | 65 | 64.6 | 64.8 | 64.9 |
| $Al_2O_3$ | 21.8 | 21.8 | 21.5 | 21.7 | 22.4 |
| $B_2O_3$ | 0 | 0 | 0 | 0 | 0 |
| MgO | 0.68 | 0.68 | 0.65 | 0.67 | 0.68 |
| CaO | 0.001 | 0.001 | 0.001 | 0.001 | 0.001 |
| SrO | 0 | 0 | 0 | 0.002 | 0 |
| BaO | 1.16 | 1.15 | 2.64 | 1.23 | 1.15 |
| ZnO | 0.001 | 0.001 | 0.001 | 0 | 0.82 |

TABLE 6-continued

| mass % | | | S | T | U | V | W |
|---|---|---|---|---|---|---|---|
| $Li_2O$ | | | 3.66 | 3.65 | 3.63 | 3.64 | 3.81 |
| $Na_2O$ | | | 0.85 | 0.39 | 0.4 | 0.39 | 0.39 |
| $K_2O$ | | | 0.3 | 0.99 | 0.29 | 0.3 | 0.79 |
| $TiO_2$ | | | 0.0092 | 0.0113 | 0.014 | 0.014 | 0.0113 |
| $ZrO_2$ | | | 3.7 | 3.64 | 3.64 | 3.71 | 2.55 |
| $P_2O_5$ | | | 1.38 | 1.38 | 1.37 | 1.38 | 1.38 |
| $SnO_2$ | | | 1.36 | 1.39 | 1.37 | 2.24 | 1.11 |
| Heat treatment conditions | 1st step | Temp. (° C.) | 855 | 855 | 840 | 810 | 855 |
| | | Time (hrs) | 3 | 3 | 3 | 3 | 7 |
| | 2nd step | Temp. (° C.) | 920 | 920 | 920 | 920 | 920 |
| | | Time (hrs) | 1 | 1 | 1 | 1 | 1 |
| Crystallinity (%) | | | ≥40 | ≥40 | ≥40 | ≥40 | ≥40 |
| Average crystallite size (nm) | | | 47 | Not measured | Not measured | Not measured | Not measured |
| Precipitated crystal | | | β-Eucryptite solid solution — | β-Eucryptite solid solution — | β-Eucryptite solid solution — | β-Eucryptite solid solution — | β-Eucryptite solid solution — |
| Transmittance (%) | | | Not measured | Not measured | Not measured | >81 | Not measured |
| Thermal expansion coefficient (× $10^{-7}$/° C.) | | | 1.4 | 2.5 | 1.4 | −1 | Not measured |
| Young's modulus (GPa) | | | Not measured | Not measured | Not measured | Not measured | Not measured |
| Chemical strengthening | Strengthening solution | | KCl/NaCl mixed salt (83.6 wt. %/ 16.4 wt. %) | KCl/NaCl mixed salt (83.6 wt. %/ 16.4 wt. %) | KCl/NaCl mixed salt (83.6 wt. %/ 16.4 wt. %) | KCl/NaCl mixed salt (83.6 wt. %/ 16.4 wt. %) | KCl/NaCl mixed salt (83.6 wt. %/ 16.4 wt. %) |
| | Temp. (° C.) | | 720 | 720 | 720 | 720 | 720 |
| | Time (min) | | 240 | 240 | 240 | 240 | 240 |
| | CS (MPa) | | Not measured | Not measured | Not measured | Not measured | Not measured |
| | DOC (μm) | | Not measured | Not measured | Not measured | Not measured | Not measured |

TABLE 7

| mass % | | | X | Y | Z | AA | AB |
|---|---|---|---|---|---|---|---|
| $SiO_2$ | | | 64.5 | 64.6 | 64.5 | 64.5 | 67.5 |
| $Al_2O_3$ | | | 22.5 | 22.6 | 25.1 | 24.6 | 22.2 |
| $B_2O_3$ | | | 0 | 0 | 0 | 0 | 0 |
| MgO | | | 0.85 | 0.85 | 1.22 | 0.37 | 2.83 |
| CaO | | | 0.001 | 0.001 | 0.015 | 0.009 | 0.023 |
| SrO | | | 0 | 0 | 0 | 0 | 0 |
| BaO | | | 1.19 | 2.6 | 0 | 0 | 0 |
| ZnO | | | 0.5 | 0.001 | 0 | 0 | 0 |
| $Li_2O$ | | | 3.66 | 3.63 | 3.68 | 3.68 | 3.68 |
| $Na_2O$ | | | 1.49 | 0.4 | 0.33 | 0.35 | 0.07 |
| $K_2O$ | | | 0.28 | 0.29 | 0 | 0 | 0 |
| $TiO_2$ | | | 0.321 | 0.014 | 0.01 | 0.01 | 0.01 |
| $ZrO_2$ | | | 2.49 | 2.57 | 2.62 | 2.61 | 2.59 |
| $P_2O_5$ | | | 1.89 | 1.37 | 1.31 | 2.84 | 0 |
| $SnO_2$ | | | 1.52 | 1.1 | 1.13 | 1.15 | 1.15 |
| Heat treatment conditions | 1st step | Temp. (° C.) | 840 | 840 | 810 | 810 | 780 |
| | | Time (hrs) | 3 | 8 | 3 | 3 | 3 |
| | 2nd step | Temp. (° C.) | 920 | 920 | 890 | 890 | 860 |
| | | Time (hrs) | 1.5 | 1 | 1 | 1 | 1 |
| Crystallinity (%) | | | ≥40 | ≥40 | ≥40 | ≥40 | ≥40 |
| Average crystallite size (nm) | | | Not measured | Not measured | Not measured | Not measured | Not measured |
| Precipitated crystal | | | β-Eucryptite solid solution — | β-Eucryptite solid solution — | β-Eucryptite solid solution — | β-Eucryptite solid solution — | β-Eucryptite solid solution — |
| Transmittance (%) | | | Not measured | Not measured | Not measured | >50 | Not measured |
| Thermal expansion coefficient (× $10^{-7}$/° C.) | | | Not measured | Not measured | Not measured | Not measured | Not measured |
| Young's modulus (GPa) | | | Not measured | Not measured | Not measured | Not measured | Not measured |

TABLE 7-continued

| mass % | | X | Y | Z | AA | AB |
|---|---|---|---|---|---|---|
| Chemical strengthening | Strengthening solution | KCl/NaCl mixed salt (83.6 wt. %/ 16.4 wt. %) | KCl/NaCl mixed salt (83.6 wt. %/ 16.4 wt. %) | KCl/NaCl mixed salt (83.6 wt. %/ 16.4 wt. %) | KCl/NaCl mixed salt (83.6 wt. %/ 16.4 wt. %) | KCl/NaCl mixed salt (83.6 wt. %/ 16.4 wt. %) |
| | Temp. (° C.) | 720 | 720 | 720 | 720 | 720 |
| | Time (min) | 240 | 240 | 240 | 240 | 240 |
| | CS (MPa) | Not measured | Not measured | Not measured | Not measured | Not measured |
| | DOC (μm) | Not measured | Not measured | Not measured | Not measured | Not measured |

TABLE 8

| mass % | | | AC | AD | AE | AF |
|---|---|---|---|---|---|---|
| $SiO_2$ | | | 64.4 | 68.9 | 67.9 | 65.7 |
| $Al_2O_3$ | | | 23.7 | 22.2 | 22.3 | 22.2 |
| $B_2O_3$ | | | 0 | 0 | 0 | 0 |
| MgO | | | 1.22 | 1.22 | 1.25 | 0.7 |
| CaO | | | 0.014 | 0.02 | 0.024 | 0 |
| SrO | | | 0 | 0 | 0 | 0 |
| BaO | | | 1.95 | 0 | 0 | 1.2 |
| ZnO | | | 0 | 0 | 0 | 0 |
| $Li_2O$ | | | 3.68 | 3.68 | 3.68 | 3.7 |
| $Na_2O$ | | | 0.36 | 0.35 | 0.67 | 0.4 |
| $K_2O$ | | | 0 | 0 | 0.01 | 0.3 |
| $TiO_2$ | | | 0.01 | 0.01 | 0.02 | 2 |
| $ZrO_2$ | | | 2.6 | 2.56 | 2.62 | 2.2 |
| $P_2O_5$ | | | 0.81 | 0 | 0.4 | 1.4 |
| $SnO_2$ | | | 1.19 | 1.17 | 1.13 | 0.2 |
| Heat treatment conditions | 1st step | Temp. (° C.) | 765 | 780 | 780 | 780 |
| | | Time (hrs) | 3 | 3 | 3 | 0.75 |
| | 2nd step | Temp. (° C.) | 860 | 890 | 890 | 890 |
| | | Time (hrs) | 1 | 1 | 1 | 0.25 |
| Crystallinity (%) | | | ≥40 | ≥40 | ≥40 | ≥40 |
| Average crystallite size (nm) | | | Not measured | Not measured | 41 | Not measured |
| Precipitated crystal | | | β-Eucryptite solid solution — | β-Eucryptite solid solution — | β-Eucryptite solid solution — | β-Eucryptite solid solution — |
| Transmittance (%) | | | Not measured | Not measured | >83 | Not measured |
| Thermal expansion coefficient (× $10^{-7}$/° C.) | | | Not measured | −3.1 | −1.3 | Not measured |
| Young's modulus (GPa) | | | Not measured | Not measured | Not measured | Not measured |
| Chemical strengthening | Strengthening solution | | KCl/NaCl mixed salt (83.6 wt. %/ 16.4 wt. %) | KCl/NaCl mixed salt (83.6 wt. %/ 16.4 wt. %) | KCl/NaCl mixed salt (83.6 wt. %/ 16.4 wt. %) | KCl/NaCl mixed salt (83.6 wt. %/ 16.4 wt. %) |
| | Temp. (° C.) | | 720 | 720 | 720 | 720 |
| | Time (min) | | 240 | 240 | 240 | 240 |
| | CS (MPa) | | Not measured | Not measured | Not measured | Not measured |
| | DOC (μm) | | Not measured | Not measured | Not measured | Not measured |

TABLE 9

| mass % | AG | AH | AI | AJ | AK |
|---|---|---|---|---|---|
| $SiO_2$ | 67.9 | 67.9 | 67.9 | 67.9 | 67.9 |
| $Al_2O_3$ | 22.3 | 22.3 | 22.3 | 22.3 | 22.3 |
| $B_2O_3$ | 0 | 0 | 0 | 0 | 0 |
| MgO | 1.25 | 1.25 | 1.25 | 1.25 | 1.25 |
| CaO | 0 | 0 | 0 | 0 | 0 |
| SrO | 0 | 0 | 0 | 0 | 0 |
| BaO | 0 | 0 | 0 | 0 | 0 |
| ZnO | 0 | 0 | 0 | 0 | 0 |

TABLE 9-continued

| mass % | | | AG | AH | AI | AJ | AK |
|---|---|---|---|---|---|---|---|
| $Li_2O$ | | | 3.68 | 3.68 | 3.68 | 3.68 | 3.68 |
| $Na_2O$ | | | 0.67 | 0.67 | 0.67 | 0.67 | 0.67 |
| $K_2O$ | | | 0 | 0 | 0 | 0 | 0 |
| $TiO_2$ | | | 0 | 0 | 0 | 0 | 0 |
| $ZrO_2$ | | | 2.62 | 2.62 | 2.62 | 2.62 | 2.62 |
| $P_2O_5$ | | | 0.40 | 0.40 | 0.40 | 0.40 | 0.40 |
| $SnO_2$ | | | 1.13 | 1.13 | 1.13 | 1.13 | 1.13 |
| Heat treatment conditions | 1st step | Temp. (° C.) | 780 | 780 | 780 | 780 | 780 |
| | | Time (min) | 360 | 360 | 360 | 360 | 360 |
| | 2nd step | Temp. (° C.) | 890 | 890 | 890 | 890 | 890 |
| | | Time (min) | 60 | 60 | 60 | 60 | 60 |
| Crystallinity (%) | | | 90 | 90 | 90 | 90 | 90 |
| Average crystallite size (nm) | | | Not measured | Not measured | Not measured | Not measured | Not measured |
| Precipitated crystal | | | β-Eucryptite solid solution β-Spodumene solid solution | β-Eucryptite solid solution β-Spodumene solid solution | β-Eucryptite solid solution β-Spodumene solid solution | β-Eucryptite solid solution β-Spodumene solid solution | β-Eucryptite solid solution β-Spodumene solid solution |
| Transmittance (%) | | | 91 | 91 | 91 | 91 | 91 |
| Thermal expansion coefficient ($\times 10^{-7}$/° C.) | | | −0.2 | −0.2 | −0.2 | −0.2 | −0.2 |
| Young's modulus (GPa) | | | 93 | 93 | 93 | 93 | 93 |
| Chemical strengthening | Strengthening solution | | KCl/NaCl mixed salt (83.6 wt. %/ 16.4 wt. %) | KCl/NaCl mixed salt (83.6 wt. %/ 16.4 wt. %) | KCl/NaCl mixed salt (83.6 wt. %/ 16.4 wt. %) | KCl/NaCl mixed salt (70.0 wt. %/ 30.0 wt. %) | KCl/NaCl mixed salt (56.1 wt. %/ 43.9 wt. %) |
| | Temp. (° C.) | | 720 | 720 | 750 | 750 | 750 |
| | Time (min) | | 240 | 300 | 240 | 240 | 240 |
| | CS (MPa) | | 337 | 213 | 202 | 190 | 214 |
| | DOC (μm) | | 108 | 113 | 127 | 133 | 78 |

The crystallized glasses of Examples A to AK were produced as follows.

First, a batch raw material prepared to give any of the compositions in the table was placed into a melting kiln, melted at 1500 to 1600° C., then the molten glass raw material was roll-formed and then annealed, and a crystallizable glass of 900×1200×7 mm was produced. This crystallizable glass was heat-treated at the temperature and for the time described in the table, and a crystallized glass was obtained accordingly.

The resulting crystallized glass was then polished to 0.615 mm, then the crystallized glass was subjected to ion exchange treatment under conditions described in the table, and a chemically strengthened crystallized glass was obtained.

The sample thus prepared was evaluated for crystallinity, precipitated crystal, transmittance, Young's modulus, compression stress value (CS), and depth of compression stress (DOC). The results are shown in Table 2.

Young's modulus was calculated by the method in accordance with JIS R 1602-1995 "Elastic Modulus Test Method for Fine Ceramics".

The compression stress value (CS) and depth of compression stress (DOC) were measured using a scattered light photo elastic stress meter SLP-1000 (available from Orihara Manufacturing Co., Ltd.) and a surface stress meter FSM-6000 (available from Orihara Manufacturing Co., Ltd.). The stress characteristics were calculated using a refractive index of 1.52 and a photo elasticity constant of 25.1 [(nm/cm)/MPa] for each measurement sample.

Examples A to AK of the present invention were crystallized glasses with a crystallinity of 40% or greater and had a high transmittance of 50% or greater and a high Young's modulus of 92 to 93 GPa. In addition, the high-temperature molten salt was subjected to ion exchange treatment, and thus the crystallized glasses were sufficiently chemically strengthened.

Example 3

Tables 10 to 16 show Examples 7 to 48.

TABLE 10

| mass % | 7 | 8 | 9 | 10 | 11 | 12 |
|---|---|---|---|---|---|---|
| $SiO_2$ | 67.9 | 67.9 | 67.9 | 67.9 | 67.9 | 67.9 |
| $Al_2O_3$ | 22.3 | 22.3 | 22.3 | 22.3 | 22.3 | 22.3 |
| $B_2O_3$ | 0 | 0 | 0 | 0 | 0 | 0 |
| MgO | 1.25 | 1.25 | 1.25 | 1.25 | 1.25 | 1.25 |
| CaO | 0 | 0 | 0 | 0 | 0 | 0 |
| SrO | 0 | 0 | 0 | 0 | 0 | 0 |
| BaO | 0 | 0 | 0 | 0 | 0 | 0 |
| ZnO | 0 | 0 | 0 | 0 | 0 | 0 |
| $Li_2O$ | 3.68 | 3.68 | 3.68 | 3.68 | 3.68 | 3.68 |
| $Na_2O$ | 0.67 | 0.67 | 0.67 | 0.67 | 0.67 | 0.67 |
| $K_2O$ | 0 | 0 | 0 | 0 | 0 | 0 |
| $TiO_2$ | 0 | 0 | 0 | 0 | 0 | 0 |
| $ZrO_2$ | 2.62 | 2.62 | 2.62 | 2.62 | 2.62 | 2.62 |
| $P_2O_5$ | 0.4 | 0.4 | 0.4 | 0.4 | 0.4 | 0.4 |

TABLE 10-continued

| mass % | | | 7 | 8 | 9 | 10 | 11 | 12 |
|---|---|---|---|---|---|---|---|---|
| | $SnO_2$ | | 1.13 | 1.13 | 1.13 | 1.13 | 1.13 | 1.13 |
| Heat treatment conditions | 1st step | Temp. (° C.) | 780 | 780 | 780 | 780 | 780 | 780 |
| | | Time (min) | 180 | 180 | 180 | 180 | 180 | 180 |
| | 2nd step | Temp. (° C.) | 800 | 800 | 830 | 830 | 830 | 830 |
| | | Time (min) | 60 | 180 | 60 | 60 | 60 | 60 |
| | Crystallinity | | <40% | <40% | <40% | <40% | <40% | <40% |
| | Precipitated crystal | | Zirconia<br>— | Zirconia<br>— | β-Eucryptite solid solution<br>Zirconia | β-Eucryptite solid solution<br>Zirconia | β-Eucryptite solid solution<br>Zirconia | β-Eucryptite solid solution<br>Zirconia |
| | Transmittance | | >90% | >90% | >90% | >90% | >90% | >90% |
| | Thermal expansion coefficient | | Not measured | Not measured | Not measured | Not measured | Not measured | Not measured |
| | Young's modulus | | Not measured | Not measured | Not measured | Not measured | Not measured | Not measured |
| Chemical strengthening | Strengthening solution | | $NaNO_3$ (100 wt. %) | $NaNO_3$/$LiNO_3$ (95 wt. %/5 wt. %) | $NaNO_3$/$LiNO_3$ (95 wt. %/5 wt. %) | $NaNO_3$ (100 wt. %) | $NaNO_3$ (100 wt. %) | $NaNO_3$ (100 wt. %) |
| | Temp. (° C.) | | 430 | 430 | 430 | 430 | 430 | 430 |
| | Time (min) | | 120 | 120 | 90 | 120 | 30 | 60 |
| | CS (MPa) | | 449 | 45 | 298 | 259 | 420 | 389 |
| | DOC (μm) | | 138 | 174 | 111 | 123 | 76 | 94 |
| | Sheet thickness (mm) | | 1 | 1 | 0.6 | 0.6 | 0.6 | 0.6 |
| | Scratch four-point flexural strength (MPa) | | Not measured | Not measured | 217 | Not measured | Not measured | 254 |
| | Vickers hardness value | | Not measured | Not measured | 680 | Not measured | Not measured | 670 |

TABLE 11

| mass % | | | 13 | 14 | 15 | 16 | 17 | 18 |
|---|---|---|---|---|---|---|---|---|
| | $SiO_2$ | | 67.9 | 67.9 | 67.9 | 67.9 | 67.9 | 67.9 |
| | $Al_2O_3$ | | 22.3 | 22.3 | 22.3 | 22.3 | 22.3 | 22.3 |
| | $B_2O_3$ | | 0 | 0 | 0 | 0 | 0 | 0 |
| | MgO | | 1.25 | 1.25 | 1.25 | 1.25 | 1.25 | 1.25 |
| | CaO | | 0 | 0 | 0 | 0 | 0 | 0 |
| | SrO | | 0 | 0 | 0 | 0 | 0 | 0 |
| | BaO | | 0 | 0 | 0 | 0 | 0 | 0 |
| | ZnO | | 0 | 0 | 0 | 0 | 0 | 0 |
| | $Li_2O$ | | 3.68 | 3.68 | 3.68 | 3.68 | 3.68 | 3.68 |
| | $Na_2O$ | | 0.67 | 0.67 | 0.67 | 0.67 | 0.67 | 0.67 |
| | $K_2O$ | | 0 | 0 | 0 | 0 | 0 | 0 |
| | $TiO_2$ | | 0 | 0 | 0 | 0 | 0 | 0 |
| | $ZrO_2$ | | 2.62 | 2.62 | 2.62 | 2.62 | 2.62 | 2.62 |
| | $P_2O_5$ | | 0.4 | 0.4 | 0.4 | 0.4 | 0.4 | 0.4 |
| | $SnO_2$ | | 1.13 | 1.13 | 1.13 | 1.13 | 1.13 | 1.13 |
| Heat treatment conditions | 1st step | Temp. (° C.) | 780 | 780 | 780 | 780 | 780 | 780 |
| | | Time (min) | 180 | 180 | 180 | 180 | 180 | 180 |
| | 2nd step | Temp. (° C.) | 830 | 830 | 830 | 830 | 830 | 830 |
| | | Time (min) | 60 | 60 | 60 | 60 | 60 | 60 |
| | Crystallinity | | <40% | <40% | <40% | <40% | <40% | <40% |
| | Precipitated crystal | | β-Eucryptite solid solution<br>Zirconia | β-Eucryptite solid solution<br>Zirconia | β-Eucryptite solid solution<br>Zirconia | β-Eucryptite solid solution<br>Zirconia | β-Eucryptite solid solution<br>Zirconia | β-Eucryptite solid solution<br>Zirconia |
| | Transmittance | | >90% | >90% | >90% | >90% | >90% | >90% |
| | Thermal expansion coefficient | | Not measured | Not measured | Not measured | Not measured | Not measured | Not measured |
| | Young's modulus | | Not measured | Not measured | Not measured | Not measured | Not measured | Not measured |
| Chemical strengthening | Strengthening solution | | $NaNO_3$ (100 wt. %) | $NaNO_3$ (100 wt. %) | $NaNO_3$ (100 wt. %) | $NaNO_3$ (100 wt. %) | $NaNO_3$ (100 wt. %) | $NaNO_3$ (100 wt. %) |
| | Temp. (° C.) | | 430 | 430 | 430 | 430 | 430 | 430 |
| | Time (min) | | 70 | 80 | 90 | 120 | 150 | 180 |
| | CS (MPa) | | 355 | 365 | 355 | 352 | 323 | 306 |
| | DOC (μm) | | 101 | 104 | 108 | 115 | 122 | 126 |
| | Sheet thickness (mm) | | 0.6 | 0.6 | 0.6 | 0.6 | 0.6 | 0.6 |
| | Scratch four-point flexural strength (MPa) | | 266 | 253 | 272 | Not measured | Not measured | Not measured |
| | Vickers hardness value | | 680 | 680 | 680 | Not measured | Not measured | Not measured |

TABLE 12

| mass % | | | 19 | 20 | 21 | 22 | 23 | 24 |
|---|---|---|---|---|---|---|---|---|
| $SiO_2$ | | | 67.9 | 65.9 | 64.7 | 65.6 | 65.1 | 66.2 |
| $Al_2O_3$ | | | 22.3 | 22.3 | 21.9 | 22.2 | 22 | 22.4 |
| $B_2O_3$ | | | 0 | 0 | 0 | 0 | 0.01 | 0 |
| MgO | | | 1.25 | 0.7 | 0.69 | 0.2 | 0.4 | 0.69 |
| CaO | | | 0 | 0 | 0 | 0 | 0 | 0 |
| SrO | | | 0 | 0 | 0 | 0 | 0 | 0.01 |
| BaO | | | 0 | 1.2 | 1.18 | 1.18 | 1.18 | 0 |
| ZnO | | | 0 | 0 | 0 | 0 | 0 | 0 |
| $Li_2O$ | | | 3.68 | 3.71 | 3.64 | 3.7 | 4.1 | 3.74 |
| $Na_2O$ | | | 0.67 | 0.4 | 0.39 | 0.39 | 0.39 | 0.38 |
| $K_2O$ | | | 0 | 0.3 | 0.3 | 0.3 | 0.3 | 0 |
| $TiO_2$ | | | 0 | 0.0023 | 0.0044 | 0.0015 | 0.003 | 0.0031 |
| $ZrO_2$ | | | 2.62 | 3.39 | 4.06 | 3.7 | 3.7 | 3.84 |
| $P_2O_5$ | | | 0.4 | 1.4 | 1.38 | 1.38 | 1.38 | 1.39 |
| $SnO_2$ | | | 1.13 | 0.69 | 1.81 | 1.4 | 1.4 | 1.34 |
| Heat treatment conditions | 1st step | Temp. (° C.) | 780 | 780 | 780 | 780 | 780 | 780 |
| | | Time (min) | 180 | 180 | 180 | 180 | 180 | 180 |
| | 2nd step | Temp. (° C.) | 830 | 830 | 830 | 830 | 830 | 830 |
| | | Time (min) | 60 | 60 | 60 | 60 | 60 | 60 |
| Crystallinity | | | <40% | <40% | <40% | <40% | <40% | <40% |
| Precipitated crystal | | | β-Eucryptite solid solution Zirconia | β-Eucryptite solid solution Zirconia | β-Eucryptite solid solution Zirconia | β-Eucryptite solid solution Zirconia | Not measured | Not measured |
| Transmittance | | | >90% | >90% | >90% | >90% | Not measured | Not measured |
| Thermal expansion coefficient | | | Not measured | Not measured | Not measured | Not measured | Not measured | Not measured |
| Young's modulus | | | Not measured | Not measured | Not measured | Not measured | Not measured | Not measured |
| Chemical strengthening | | Strengthening solution | $NaNO_3$ (100 wt. %) | $NaNO_3$ (100 wt. %) | $NaNO_3$ (100 wt. %) | $NaNO_3$ (100 wt. %) | $NaNO_3$ (100 wt. %) | $NaNO_3$ (100 wt. %) |
| | | Temp. (° C.) | 430 | 430 | 430 | 430 | 430 | 430 |
| | | Time (min) | 240 | 90 | 90 | 90 | 90 | 90 |
| | | CS (MPa) | 283 | Not measured | Not measured | Not measured | Not measured | Not measured |
| | | DOC (μm) | 130 | Not measured | Not measured | Not measured | Not measured | Not measured |
| Sheet thickness (mm) | | | 0.6 | 0.6 | 0.6 | 0.6 | 0.6 | 0.6 |
| Scratch four-point flexural strength (MPa) | | | Not measured | Not measured | Not measured | Not measured | Not measured | Not measured |
| Vickers hardness value | | | Not measured | Not measured | Not measured | Not measured | Not measured | Not measured |

TABLE 13

| mass % | | | 25 | 26 | 27 | 28 | 29 | 30 |
|---|---|---|---|---|---|---|---|---|
| $SiO_2$ | | | 66.7 | 65.9 | 67.2 | 66.1 | 68 | 65.7 |
| $Al_2O_3$ | | | 22.2 | 22.2 | 21.6 | 21.7 | 22.6 | 21.9 |
| $B_2O_3$ | | | 0.82 | 0 | 0 | 0 | 0 | 0.6 |
| MgO | | | 0 | 1.52 | 1.23 | 0.68 | 0.4 | 1.23 |
| CaO | | | 0.02 | 0.35 | 0 | 0.03 | 0.02 | 0.1 |
| SrO | | | 0.34 | 0.001 | 0 | 0.43 | 0 | 0 |
| BaO | | | 0.48 | 0 | 0.3 | 1.16 | 0 | 0 |
| ZnO | | | 1.66 | 0.01 | 0.01 | 0 | 0.9 | 0 |
| $Li_2O$ | | | 2.2 | 4.02 | 3.3 | 3.63 | 3.74 | 3.64 |
| $Na_2O$ | | | 0.01 | 0.37 | 0.37 | 0.41 | 0.09 | 0.07 |
| $K_2O$ | | | 0.01 | 0 | 0 | 0.02 | 0 | 0 |
| $TiO_2$ | | | 0 | 0.008 | 0.156 | 0.0235 | 0.0141 | 0.0385 |
| $ZrO_2$ | | | 3.9 | 3.9 | 1.89 | 3.01 | 3.06 | 3.06 |
| $P_2O_5$ | | | 0 | 1.4 | 1.41 | 1.36 | 0 | 2.55 |
| $SnO_2$ | | | 1.63 | 0.45 | 1.18 | 1.21 | 1.22 | 1.25 |
| Heat treatment conditions | 1st step | Temp. (° C.) | 780 | 780 | 780 | 780 | 780 | 780 |
| | | Time (min) | 180 | 180 | 180 | 180 | 180 | 180 |
| | 2nd step | Temp. (° C.) | 830 | 830 | 830 | 830 | 830 | 830 |
| | | Time (min) | 60 | 60 | 60 | 60 | 60 | 60 |
| Crystallinity | | | <40% | <40% | <40% | <40% | <40% | <40% |
| Precipitated crystal | | | Not measured | Not measured | Not measured | Not measured | Not measured | Not measured |
| Transmittance | | | Not measured | Not measured | Not measured | Not measured | Not measured | Not measured |
| Thermal expansion coefficient | | | Not measured | Not measured | Not measured | Not measured | Not measured | Not measured |

TABLE 13-continued

| mass % | | | 25 | 26 | 27 | 28 | 29 | 30 |
|---|---|---|---|---|---|---|---|---|
| Young's modulus | | | Not measured | Not measured | Not measured | Not measured | Not measured | Not measured |
| Chemical strengthening | Strengthening solution | | $NaNO_3$ (100 wt. %) | $NaNO_3$ (100 wt. %) | $NaNO_3$ (100 wt. %) | $NaNO_3$ (100 wt. %) | $NaNO_3$ (100 wt. %) | $NaNO_3$ (100 wt. %) |
| | Temp. (° C.) | | 430 | 430 | 430 | 430 | 430 | 430 |
| | Time (min) | | 90 | 90 | 90 | 90 | 90 | 90 |
| | CS (MPa) | | Not measured | Not measured | Not measured | Not measured | Not measured | Not measured |
| | DOC (μm) | | Not measured | Not measured | Not measured | Not measured | Not measured | Not measured |
| Sheet thickness (mm) | | | 0.6 | 0.6 | 0.6 | 0.6 | 0.6 | 0.6 |
| Scratch four-point flexural strength (MPa) | | | Not measured | Not measured | Not measured | Not measured | Not measured | Not measured |
| Vickers hardness value | | | Not measured | Not measured | Not measured | Not measured | Not measured | Not measured |

TABLE 14

| mass % | | | 31 | 32 | 33 | 34 | 35 | 36 |
|---|---|---|---|---|---|---|---|---|
| $SiO_2$ | | | 66.5 | 66.5 | 66.2 | 67 | 65.2 | 65 |
| $Al_2O_3$ | | | 21.8 | 22 | 22.2 | 22.3 | 21.8 | 21.8 |
| $B_2O_3$ | | | 0 | 0 | 0 | 0 | 0 | 0 |
| MgO | | | 0.69 | 1.2 | 1.2 | 1.17 | 0.68 | 0.68 |
| CaO | | | 0 | 0 | 0 | 0 | 0.001 | 0.001 |
| SrO | | | 0 | 0.01 | 0 | 0 | 0 | 0 |
| BaO | | | 1.18 | 0 | 1.2 | 0.0008 | 1.16 | 1.15 |
| ZnO | | | 0.01 | 0 | 0 | 0 | 0.001 | 0.001 |
| $Li_2O$ | | | 3.63 | 3.5 | 2.35 | 3.68 | 3.66 | 3.65 |
| $Na_2O$ | | | 0.41 | 0.4 | 0.4 | 0.39 | 0.85 | 0.39 |
| $K_2O$ | | | 0 | 0 | 0.3 | 0.0032 | 0.3 | 0.99 |
| $TiO_2$ | | | 0.0182 | 0.0058 | 0.0072 | 0.0058 | 0.0092 | 0.0113 |
| $ZrO_2$ | | | 2.95 | 3 | 2.99 | 2.73 | 3.7 | 3.64 |
| $P_2O_5$ | | | 1.4 | 1.42 | 1.4 | 1.36 | 1.38 | 1.38 |
| $SnO_2$ | | | 1.36 | 1.33 | 1.3 | 1.19 | 1.36 | 1.39 |
| Heat treatment conditions | 1st step | Temp. (° C.) | 780 | 780 | 780 | 780 | 780 | 780 |
| | | Time (min) | 180 | 180 | 180 | 180 | 180 | 180 |
| | 2nd step | Temp. (° C.) | 830 | 830 | 830 | 830 | 830 | 830 |
| | | Time (min) | 60 | 60 | 60 | 60 | 60 | 60 |
| Crystallinity | | | <40% | <40% | <40% | <40% | <40% | <40% |
| Precipitated crystal | | | Not measured | Not measured | Not measured | Not measured | Not measured | Not measured |
| Transmittance | | | Not measured | Not measured | Not measured | Not measured | Not measured | Not measured |
| Thermal expansion coefficient | | | Not measured | Not measured | Not measured | Not measured | Not measured | Not measured |
| Young's modulus | | | Not measured | Not measured | Not measured | Not measured | Not measured | Not measured |
| Chemical strengthening | Strengthening solution | | $NaNO_3$ (100 wt. %) | $NaNO_3$ (100 wt. %) | $NaNO_3$ (100 wt. %) | $NaNO_3$ (100 wt. %) | $NaNO_3$ (100 wt. %) | $NaNO_3$ (100 wt. %) |
| | Temp. (° C.) | | 430 | 430 | 430 | 430 | 430 | 430 |
| | Time (min) | | 90 | 90 | 90 | 90 | 90 | 90 |
| | CS (MPa) | | Not measured | Not measured | Not measured | Not measured | Not measured | Not measured |
| | DOC (μm) | | Not measured | Not measured | Not measured | Not measured | Not measured | Not measured |
| Sheet thickness (mm) | | | 0.6 | 0.6 | 0.6 | 0.6 | 0.6 | 0.6 |
| Scratch four-point flexural strength (MPa) | | | Not measured | Not measured | Not measured | Not measured | Not measured | Not measured |
| Vickers hardness value | | | Not measured | Not measured | Not measured | Not measured | Not measured | Not measured |

TABLE 15

| mass % | 37 | 38 | 39 | 40 | 41 | 42 |
|---|---|---|---|---|---|---|
| $SiO_2$ | 64.6 | 64.8 | 64.9 | 64.5 | 64.6 | 64.5 |
| $Al_2O_3$ | 21.5 | 21.7 | 22.4 | 22.5 | 22.6 | 25.1 |
| $B_2O_3$ | 0 | 0 | 0 | 0 | 0 | 0 |
| MgO | 0.65 | 0.67 | 0.68 | 0.85 | 0.85 | 1.22 |
| CaO | 0.001 | 0.001 | 0.001 | 0.001 | 0.001 | 0.015 |
| SrO | 0 | 0.002 | 0 | 0 | 0 | 0 |
| BaO | 2.64 | 1.23 | 1.15 | 1.19 | 2.6 | 0 |

TABLE 15-continued

| mass % | | | 37 | 38 | 39 | 40 | 41 | 42 |
|---|---|---|---|---|---|---|---|---|
| $ZnO$ | | | 0.001 | 0 | 0.82 | 0.5 | 0.001 | 0 |
| $Li_2O$ | | | 3.63 | 3.64 | 3.81 | 3.66 | 3.63 | 3.68 |
| $Na_2O$ | | | 0.4 | 0.39 | 0.39 | 1.49 | 0.4 | 0.33 |
| $K_2O$ | | | 0.29 | 0.3 | 0.79 | 0.28 | 0.29 | 0 |
| $TiO_2$ | | | 0.014 | 0.014 | 0.0113 | 0.321 | 0.014 | 0.01 |
| $ZrO_2$ | | | 3.64 | 3.71 | 2.55 | 2.49 | 2.57 | 2.62 |
| $P_2O_5$ | | | 1.37 | 1.38 | 1.38 | 1.89 | 1.37 | 1.31 |
| $SnO_2$ | | | 1.37 | 2.24 | 1.11 | 1.52 | 1.1 | 1.13 |
| Heat treatment conditions | 1st step | Temp. (° C.) | 780 | 780 | 780 | 780 | 780 | 780 |
| | | Time (min) | 180 | 180 | 180 | 180 | 180 | 180 |
| | 2nd step | Temp. (° C.) | 830 | 830 | 830 | 830 | 830 | 830 |
| | | Time (min) | 60 | 60 | 60 | 60 | 60 | 60 |
| Crystallinity | | | <40% | <40% | <40% | <40% | <40% | <40% |
| Precipitated crystal | | | Not measured | Not measured | Not measured | Not measured | Not measured | Not measured |
| Transmittance | | | Not measured | Not measured | Not measured | Not measured | Not measured | Not measured |
| Thermal expansion coefficient | | | Not measured | Not measured | Not measured | Not measured | Not measured | Not measured |
| Young's modulus | | | Not measured | Not measured | Not measured | Not measured | Not measured | Not measured |
| Chemical strengthening | Strengthening solution | | $NaNO_3$ (100 wt. %) | $NaNO_3$ (100 wt. %) | $NaNO_3$ (100 wt. %) | $NaNO_3$ (100 wt. %) | $NaNO_3$ (100 wt. %) | $NaNO_3$ (100 wt. %) |
| | Temp. (° C.) | | 430 | 430 | 430 | 430 | 430 | 430 |
| | Time (min) | | 90 | 90 | 90 | 90 | 90 | 90 |
| | CS (MPa) | | Not measured | Not measured | Not measured | Not measured | Not measured | Not measured |
| | DOC (μm) | | Not measured | Not measured | Not measured | Not measured | Not measured | Not measured |
| Sheet thickness (mm) | | | 0.6 | 0.6 | 0.6 | 0.6 | 0.6 | 0.6 |
| Scratch four-point flexural strength (MPa) | | | Not measured | Not measured | Not measured | Not measured | Not measured | Not measured |
| Vickers hardness value | | | Not measured | Not measured | Not measured | Not measured | Not measured | Not measured |

TABLE 16

| mass % | | | 43 | 44 | 45 | 46 | 47 | 48 |
|---|---|---|---|---|---|---|---|---|
| $SiO_2$ | | | 64.5 | 67.5 | 64.4 | 68.9 | 67.9 | 65.7 |
| $Al_2O_3$ | | | 24.6 | 22.2 | 23.7 | 22.2 | 22.3 | 22.2 |
| $B_2O_3$ | | | 0 | 0 | 0 | 0 | 0 | 0 |
| $MgO$ | | | 0.37 | 2.83 | 1.22 | 1.22 | 1.25 | 0.7 |
| $CaO$ | | | 0.009 | 0.023 | 0.014 | 0.02 | 0.024 | 0 |
| $SrO$ | | | 0 | 0 | 0 | 0 | 0 | 0 |
| $BaO$ | | | 0 | 0 | 1.95 | 0 | 0 | 1.2 |
| $ZnO$ | | | 0 | 0 | 0 | 0 | 0 | 0 |
| $Li_2O$ | | | 3.68 | 3.68 | 3.68 | 3.68 | 3.68 | 3.7 |
| $Na_2O$ | | | 0.35 | 0.07 | 0.36 | 0.35 | 0.67 | 0.4 |
| $K_2O$ | | | 0 | 0 | 0 | 0 | 0.01 | 0.3 |
| $TiO_2$ | | | 0.01 | 0.01 | 0.01 | 0.01 | 0.02 | 2 |
| $ZrO_2$ | | | 2.61 | 2.59 | 2.6 | 2.56 | 2.62 | 2.2 |
| $P_2O_5$ | | | 2.84 | 0 | 0.81 | 0 | 0.4 | 1.4 |
| $SnO_2$ | | | 1.15 | 1.15 | 1.19 | 1.17 | 1.13 | 0.2 |
| Heat treatment conditions | 1st step | Temp. (° C.) | 780 | 780 | 780 | 780 | 780 | 780 |
| | | Time (min) | 180 | 180 | 180 | 180 | 180 | 180 |
| | 2nd step | Temp. (° C.) | 830 | 830 | 830 | 830 | 830 | 830 |
| | | Time (min) | 60 | 60 | 60 | 60 | 60 | 60 |
| Crystallinity | | | <40% | <40% | <40% | <40% | <40% | <40% |
| Precipitated crystal | | | Not measured | Not measured | Not measured | Not measured | Not measured | Not measured |
| Transmittance | | | Not measured | Not measured | Not measured | Not measured | Not measured | Not measured |
| Thermal expansion coefficient | | | Not measured | Not measured | Not measured | Not measured | Not measured | Not measured |
| Young's modulus | | | Not measured | Not measured | Not measured | Not measured | Not measured | Not measured |
| Chemical strengthening | Strengthening solution | | $NaNO_3$ (100 wt. %) | $NaNO_3$ (100 wt. %) | $NaNO_3$ (100 wt. %) | $NaNO_3$ (100 wt. %) | $NaNO_3$ (100 wt. %) | $NaNO_3$ (100 wt. %) |
| | Temp. (° C.) | | 430 | 430 | 430 | 430 | 430 | 430 |
| | Time (min) | | 90 | 90 | 90 | 90 | 90 | 90 |
| | CS (MPa) | | Not measured | Not measured | Not measured | Not measured | Not measured | Not measured |

TABLE 16-continued

| mass % | 43 | 44 | 45 | 46 | 47 | 48 |
|---|---|---|---|---|---|---|
| DOC (μm) | Not measured | Not measured | Not measured | Not measured | Not measured | Not measured |
| Sheet thickness (mm) | 0.6 | 0.6 | 0.6 | 0.6 | 0.6 | 0.6 |
| Scratch four-point flexural strength (MPa) | Not measured | Not measured | Not measured | Not measured | Not measured | Not measured |
| Vickers hardness value | Not measured | Not measured | Not measured | Not measured | Not measured | Not measured |

The crystallized glasses of Examples 7 to 48 were produced as follows.

First, a batch raw material prepared to give any of the compositions in the table was placed into a melting kiln, melted at 1500 to 1600° C., then the molten glass raw material was roll-formed and then annealed, and a crystallizable glass of 900×1200×7 mm was produced. This crystallizable glass was heat-treated at the temperature for the time described in the table, and a crystallized glass was obtained accordingly.

The resulting crystallized glass was then polished to the thickness described in the table, then the crystallized glass was subjected to ion exchange treatment under conditions described in the table, and a chemically strengthened crystallized glass was obtained.

The sample thus produced was evaluated for crystallinity, precipitated crystal, transmittance, Young's modulus, scratch four-point flexural strength, Vickers hardness value, and thermal expansion coefficient. The results are shown in Tables 10 to 16.

The scratch four-point flexural strength was performed measured according to a procedure as follows. First, the glass was scratched according to the following procedure. A crystallized glass sheet with a size of 50 mm×50 mm processed to any of the thicknesses shown in Tables 10 to 16 was fixed vertically to a 1.5-mm thick SUS plate and scratched by impacting the tip of a pendulum-like arm against the glass sheet over P180-grit sandpaper. The tip of the arm is a φ5-mm iron cylinder, and the weight of the arm is 550 g. The height from which the arm was swung down was 5 mm from the impact point. The four-point bending test was then performed on the scratched sample, and the strength was measured.

Examples 7 to 48 of the present invention were crystallized glasses and had a high transmittance of 90% or greater and a high scratch four-point flexural strength.

Example 4

A batch raw material prepared to give any of the compositions of Examples 7 to 48 was placed into a melting kiln, melted at 1500 to 1600° C., then the molten glass raw material was roll-formed and then annealed, and a crystallizable glass of 900×1200×7 mm was produced. This crystallizable glass was heat-treated at the temperature for the time described in the table, and a crystallized glass was obtained accordingly. The crystallized glass was then cut into individual sheets with a desired size, such as 50 mm×50 mm. The sheet was processed to a sheet thickness approximately close to the target thickness using a wire saw, then ground and polished, and a crystallized glass was obtained. The crystallized glass was subjected to ion exchange treatment under conditions described in the table, and a chemically strengthened crystallized glass was obtained.

Example 5

A batch raw material prepared to give any of the compositions of Examples 7 to 48 was placed into a melting kiln, melted at 1500 to 1600° C., then the molten glass raw material was roll-formed and then annealed, and a crystallizable glass of 900×1200×7 mm was produced. This crystallizable glass was cut into individual sheets with a desired size, such as 50 mm×50 mm. The sheet was processed to a sheet thickness approximately close to the target thickness using a wire saw and then ground and polished. The sheet was then heat-treated at the temperature and for the time described in the table, and a desired crystallized glass was obtained accordingly. The crystallized glass was subjected to ion exchange treatment under conditions described in the table, and a chemically strengthened crystallized glass was obtained.

Example 6

A batch raw material prepared to give any of the compositions of Examples 7 to 48 was placed into a melting kiln, melted at 1500 to 1600° C., then the molten glass raw material was roll-formed and then annealed, and a crystallizable glass of 900×1200×7 mm was produced. This crystallizable glass was cut into individual sheets with a desired size, such as 50 mm×50 mm, then the sheet was heat-treated at the temperature and for the time described in the table, and a desired crystallized glass was obtained accordingly. The crystallized glass was processed to a sheet thickness approximately close to the target thickness using a wire saw, then ground and polished, and a desired sample was obtained. The crystallized glass was subjected to ion exchange treatment under conditions described in the table, and a chemically strengthened crystallized glass was obtained.

Example 7

A batch raw material prepared to give any of the compositions of Examples 7 to 48 was placed into a melting kiln, melted at 1500 to 1600° C., then the molten glass raw material was roll-formed and then annealed, and a crystallizable glass of 900×1200×7 mm was produced. This crystallizable glass was polished to the sheet thickness described in the table, then heat-treated at the temperature and for the time described in the table, and a desired crystallized glass was obtained accordingly. The crystallized glass was cut into individual sheets with a desired size, such as 50 mm×50 mm, and desired samples were obtained accordingly. The crystallized glass was subjected to ion exchange treatment under conditions described in the table, and a chemically strengthened crystallized glass was obtained.

Example 8

A batch raw material prepared to give any of the compositions of Examples 7 to 48 was placed into a melting kiln, melted at 1500 to 1600° C., then the molten glass raw material was roll-formed and then annealed, and a crystallizable glass of 900×1200×7 mm was produced. This crystallizable glass was polished to a sheet thickness greater than the sheet thickness described in the table, then heat-treated at the temperature and for the time described in the table, and a desired crystallized glass was obtained accordingly. The crystallized glass was then polished to the sheet thickness in the table, cut into individual sheets, and desired samples were obtained. The crystallized glass was subjected to ion exchange treatment under conditions described in the table, and a chemically strengthened crystallized glass was obtained.

Example 9

A batch raw material prepared to give any of the compositions of Examples 7 to 48 was placed into a melting kiln, melted at 1500 to 1600° C., then the molten glass raw material was roll-formed and then annealed, and a crystallizable glass of 900×1200×7 mm was produced. This crystallizable glass was polished to the sheet thickness described in the table and then cut into individual sheets with a desired size, such as 50 mm×50 mm. The sheet was then heat-treated at the temperature and for the time described in the table, and a desired crystallized glass was obtained accordingly. The crystallized glass was subjected to ion exchange treatment under conditions described in the table, and a chemically strengthened crystallized glass was obtained.

Example 10

A batch raw material prepared to give any of the compositions of Examples 7 to 48 was placed into a melting kiln, melted at 1500 to 1600° C., then the molten glass raw material was roll-formed and then annealed, and a crystallizable glass of 900×1200×7 mm was produced. This crystallizable glass was polished to a sheet thickness greater than the sheet thickness described in the table and then cut into individual sheets with a desired size, such as 50 mm×50 mm. The sheet was then heat-treated at the temperature and for the time described in the table, and a crystallized glass was obtained accordingly. The crystallized glass was then polished to the sheet thickness in the table. The crystallized glass was subjected to ion exchange treatment under conditions described in the table, and a chemically strengthened crystallized glass was obtained.

Example 11

A batch raw material prepared to give any of the compositions of Examples 7 to 48 was placed into a melting kiln, melted at 1500 to 1600° C., then the molten glass raw material was roll-formed and then annealed, and a crystallizable glass of 900×1200×1.1 mm was produced. This crystallizable glass was cut into individual sheets with a desired size, such as 50 mm×50 mm, then the sheet was heat-treated at the temperature and for the time described in the table, and a crystallized glass was obtained accordingly. The crystallized glass was then polished to the sheet thickness in the table. The crystallized glass was subjected to ion exchange treatment under conditions described in the table, and a chemically strengthened crystallized glass was obtained.

Example 12

A batch raw material prepared to give any of the compositions of Examples 7 to 48 was placed into a melting kiln, melted at 1500 to 1600° C., then the molten glass raw material was roll-formed and then annealed, and a crystallizable glass of 900×1200×1.1 mm was produced. This crystallizable glass was heat-treated at the temperature and for the time described in the table, and a crystallized glass was obtained accordingly and then cut into individual sheets with a desired size, such as 50 mm×50 mm. The crystallized glass was then polished to the sheet thickness in the table. The crystallized glass was subjected to ion exchange treatment under conditions described in the table, and a chemically strengthened crystallized glass was obtained.

Example 13

A batch raw material prepared to give any of the compositions of Examples 7 to 48 was placed into a melting kiln, melted at 1500 to 1600° C., then the molten glass raw material was formed by down-drawing and then annealed, and a crystallizable glass of 900×1200 mm was produced. The thickness was adjusted to the thickness described in the table. This crystallizable glass was cut into individual sheets with a desired size, such as 50 mm×50 mm, then the sheet was heat-treated at the temperature and for the time described in the table, and a crystallized glass was obtained accordingly. The crystallized glass was subjected to ion exchange treatment under conditions described in the table, and a chemically strengthened crystallized glass was obtained.

Example 14

A batch raw material prepared to give any of the compositions of Examples 7 to 48 was placed into a melting kiln, melted at 1500 to 1600° C., then the molten glass raw material was formed by down-drawing and then annealed, and a crystallizable glass of 900×1200 mm was produced. The thickness was adjusted to the thickness described in the table. This crystallizable glass was heat-treated at the temperature and for the time described in the table, and a crystallized glass was obtained accordingly and then cut into individual sheets with a desired size, such as 50 mm×50 mm. The crystallized glass was subjected to ion exchange treatment under conditions described in the table, and a chemically strengthened crystallized glass was obtained.

INDUSTRIAL APPLICABILITY

The crystallized glass according to an embodiment of the present invention is suitable as a cover glass for a touch panel display, such as a mobile phone, a digital camera, and a personal digital assistant (PDA). In addition, the crystallized glass according to an embodiment of the present invention is expected to be applied to an application requiring a high Vickers hardness value and transparency, for example, a window glass, a substrate for a magnetic disk, a substrate for a flat panel display, a cover glass for a solar cell, and a cover glass for a solid-state image sensor.

The invention claimed is:

1. A crystallized glass comprising:

from 58 to 70% of $SiO_2$, from 15 to 30% of $Al_2O_3$, from 2 to 10% of $Li_2O$, from 0 to 10% of $Na_2O$, from 0 to 10% of $K_2O$, from 0 to 15% of $Na_2O+K_2O$, from 0 to 15% of $MgO+CaO+SrO+BaO+ZnO$, from 0.1 to 6% of $SnO_2$, from 0.5 to 6% of $ZrO_2$, from 0 to 4% of $TiO_2$, and from 0 to 6% of $P_2O_5$ in mass %, wherein the crystallized glass has a crystallinity of 1 to 95% and an average visible light transmittance of 50% or greater at a thickness of 0.8 mm and a wavelength of 380 to 780 nm, a compression stress layer is formed on a surface, and a crystal of zirconia is precipitated.

2. The crystallized glass according to claim 1, containing substantially no $As_2O_3$ and PbO.

3. The crystallized glass according to claim 1, wherein one or more crystals selected from a β-eucryptite solid solution and a β-spodumene solid solution are precipitated.

4. The crystallized glass according to claim 1, wherein the crystallized glass has an average crystallite size of 1 μm or less.

5. The crystallized glass according to claim 1, wherein the crystallized glass has a Vickers hardness value of 540 or greater.

6. The crystallized glass according to claim 1, wherein the crystallized glass has a flexural strength of 100 MPa or greater and a drop height of 5 mm or greater.

7. The crystallized glass according to claim 1, wherein the crystallized glass has a thermal expansion coefficient of 0 to $120\times10^{-7}$/° C. at 30 to 380° C.

8. The crystallized glass according to claim 1, wherein the crystallized glass has a Young's modulus of 80 GPa or greater.

9. A method for manufacturing a crystallized glass, the method comprising:

preparing a crystallized glass containing from 58 to 70% of $SiO_2$, from 15 to 30% of $Al_2O_3$, from 2 to 10% of $Li_2O$, from 0 to 10% of $Na_2O$, from 0 to 10% of $K_2O$, from 0 to 15% of $Na_2O+K_2O$, from 0 to 15% of MgO+CaO+SrO+BaO+ZnO, from 0.1 to 6% of $SnO_2$, from 0.5 to 6% of $ZrO_2$, from 0 to 4% of $TiO_2$, and from 0 to 6% of $P_2O_5$ in mass %, and having a crystallinity of 1 to 95%; and immersing the crystallized glass in a molten salt of 400° C. or higher to obtain a crystallized glass having a compression stress layer on a surface, wherein a crystal of zirconia is precipitated.

10. A method for manufacturing a crystallized glass, the method comprising:

preparing a crystallized glass containing from 58 to 70% of $SiO_2$, from 15 to 30% of $Al_2O_3$, from 2 to 10% of $Li_2O$, from 0 to 10% of $Na_2O$, from 0 to 10% of $K_2O$, from 0 to 15% of $Na_2O+K_2O$, from 0 to 15% of MgO+CaO+SrO+BaO+ZnO, from 0.1 to 6% of $SnO_2$, from 0.5 to 6% of $ZrO_2$, from 0 to 4% of $TiO_2$, and from 0 to 6% of $P_2O_5$ in mass %, and having a crystallinity of 40 to 95%; and immersing the crystallized glass in a molten salt of 500 to 1000° C. to obtain a crystallized glass having a compression stress layer on a surface, wherein a crystal of zirconia is precipitated.

11. A crystallized glass, wherein a crystal of zirconia is precipitated, and an average visible light transmittance is 50% or greater at a thickness of 0.8 mm and a wavelength of 380 to 780 nm.

12. The crystallized glass according to claim 11, wherein a compression stress layer is formed on a surface.

13. The crystallized glass of claim 11, wherein the crystallized glass has a crystallinity of less than 40%.

14. The crystallized glass according to claim 11, wherein the crystallized glass contains from 58 to 70% of $SiO_2$, from 15 to 30% of $Al_2O_3$, from 2 to 10% of $Li_2O$, from 0 to 10% of $Na_2O$, from 0 to 10% of $K_2O$, from 0 to 15% of $Na_2O+K_2O$, from 0 to 15% of MgO+CaO+SrO+BaO+ZnO, from 0.1 to 6% of $SnO_2$, from 0.5 to 6% of $ZrO_2$, from 0 to 4% of $TiO_2$, and from 0 to 6% of $P_2O_5$ in mass %.

* * * * *